(12) United States Patent
Walton et al.

(10) Patent No.: US 8,934,329 B2
(45) Date of Patent: Jan. 13, 2015

(54) TRANSMIT DIVERSITY PROCESSING FOR A MULTI-ANTENNA COMMUNICATION SYSTEM

(75) Inventors: J. Rodney Walton, Carlisle, MA (US);
John W. Ketchum, Harvard, MA (US);
Mark S. Wallace, Bedford, MA (US);
Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 2178 days.

(21) Appl. No.: 11/250,353

(22) Filed: Oct. 13, 2005

(65) Prior Publication Data

US 2006/0039275 A1 Feb. 23, 2006

Related U.S. Application Data

(63) Continuation of application No. 10/674,038, filed on Sep. 29, 2003, now Pat. No. 7,002,900.

(60) Provisional application No. 60/421,309, filed on Oct. 25, 2002.

(51) Int. Cl.
*H04J 11/00* (2006.01)
*H04L 27/26* (2006.01)
(Continued)

(52) U.S. Cl.
CPC ............ *H04L 27/261* (2013.01); *H04B 7/0669* (2013.01); *H04B 7/0697* (2013.01);
(Continued)

(58) Field of Classification Search
USPC .......... 370/203, 204, 208; 375/267, 299, 347; 455/103, 104
See application file for complete search history.

(56) References Cited

U.S. PATENT DOCUMENTS 4,736,371 A 4/1988 Tejima et al.
4,750,198 A 6/1988 Harper
(Continued)

FOREIGN PATENT DOCUMENTS

AU 2002259221 11/2002
CA 2690245 A1 10/2001
(Continued)

OTHER PUBLICATIONS

Li Lihua, et al.: "A Practical Space-Frequency Block Coded OFDM Scheme for Fast Fading Broadband Channels." 13th IEEE International Symposium on Personal Indoor and Mobile Radio Communications. PIMRC 2002. Sep. 15-18, 2002, pp. 212-216 vol. 1, XP002280831 ISBN: 0-7803-7589-0.
(Continued)

*Primary Examiner* — Duc Duong
(74) *Attorney, Agent, or Firm* — Eric Ho

(57) ABSTRACT

For transmit diversity in a multi-antenna OFDM system, a transmitter encodes, interleaves, and symbol maps traffic data to obtain data symbols. The transmitter processes each pair of data symbols to obtain two pairs of transmit symbols for transmission from a pair of antennas either (1) in two OFDM symbol periods for space-time transmit diversity or (2) on two subbands for space-frequency transmit diversity. $N_T \cdot (N_T - 1)/2$ different antenna pairs are used for data transmission, with different antenna pairs being used for adjacent subbands, where $N_T$ is the number of antennas. The system may support multiple OFDM symbol sizes. The same coding, interleaving, and modulation schemes are used for different OFDM symbol sizes to simplify the transmitter and receiver processing. The transmitter performs OFDM modulation on the transmit symbol stream for each antenna in accordance with the selected OFDM symbol size. The receiver performs the complementary processing.

32 Claims, 10 Drawing Sheets

(51) Int. Cl.
*H04B 7/06* (2006.01)
*H04B 7/08* (2006.01)
*H04L 1/00* (2006.01)
*H04L 1/06* (2006.01)
*H04L 25/02* (2006.01)
*H04L 25/03* (2006.01)
*H04L 1/08* (2006.01)
*H04L 1/16* (2006.01)
*H04W 28/20* (2009.01)
*H04W 52/50* (2009.01)

(52) U.S. Cl.
CPC ............ *H04B7/0854* (2013.01); *H04L 1/0017* (2013.01); *H04L 1/0059* (2013.01); *H04L 1/0061* (2013.01); *H04L 1/0069* (2013.01); *H04L 1/0071* (2013.01); *H04L 1/0618* (2013.01); *H04L 25/0242* (2013.01); *H04L 25/03343* (2013.01); *H04L 27/2601* (2013.01); *H04L 27/2602* (2013.01); *H04L 27/2647* (2013.01); *H04L 1/0003* (2013.01); *H04L 1/0009* (2013.01); *H04L 1/08* (2013.01); *H04L 1/16* (2013.01); *H04L 25/0224* (2013.01); *H04L 25/0226* (2013.01); *H04L 2001/0093* (2013.01); *H04W 28/20* (2013.01); *H04W 52/50* (2013.01)
USPC .......................................................... 370/208

(56) References Cited

U.S. PATENT DOCUMENTS

| | | | |
|---|---|---|---|
| 4,797,879 A | 1/1989 | Habbab et al. |
| 5,239,677 A | 8/1993 | Jasinski |
| 5,241,544 A | 8/1993 | Jasper et al. |
| 5,295,159 A | 3/1994 | Kerpez |
| 5,404,355 A | 4/1995 | Raith |
| 5,422,733 A | 6/1995 | Merchant et al. |
| 5,471,647 A | 11/1995 | Gerlach et al. |
| 5,479,447 A | 12/1995 | Chow et al. |
| 5,491,837 A | 2/1996 | Haartsen |
| 5,493,712 A | 2/1996 | Ramesh et al. |
| 5,506,861 A | 4/1996 | Bottomley |
| 5,509,003 A | 4/1996 | Snijders et al. |
| 5,528,581 A | 6/1996 | De Bot |
| 5,606,729 A | 2/1997 | D'Amico et al. |
| 5,638,369 A | 6/1997 | Ayerst et al. |
| 5,677,909 A | 10/1997 | Heide |
| 5,729,542 A | 3/1998 | Dupont |
| 5,790,550 A | 8/1998 | Peeters et al. |
| 5,818,813 A | 10/1998 | Saito et al. |
| 5,822,374 A | 10/1998 | Levin |
| 5,832,387 A | 11/1998 | Bae et al. |
| 5,859,875 A | 1/1999 | Kato et al. |
| 5,867,478 A | 2/1999 | Baum et al. |
| 5,867,539 A | 2/1999 | Koslov |
| 5,883,887 A | 3/1999 | Take et al. |
| 5,886,988 A | 3/1999 | Yun et al. |
| 5,959,965 A | 9/1999 | Ohkubo et al. |
| 5,973,638 A | 10/1999 | Robbins et al. |
| 5,982,327 A | 11/1999 | Vook et al. |
| 6,005,876 A | 12/1999 | Cimini, Jr. et al. |
| 6,011,963 A | 1/2000 | Ogoro |
| 6,049,548 A | 4/2000 | Bruno et al. |
| 6,067,290 A | 5/2000 | Paulraj et al. |
| 6,072,779 A | 6/2000 | Tzannes et al. |
| 6,084,915 A | 7/2000 | Williams |
| 6,097,771 A | 8/2000 | Foschini |
| 6,115,354 A | 9/2000 | Weck |
| 6,122,247 A | 9/2000 | Levin et al. |
| 6,131,016 A | 10/2000 | Greenstein et al. |
| 6,141,388 A | 10/2000 | Servais et al. |
| 6,141,542 A | 10/2000 | Kotzin et al. |
| 6,141,567 A | 10/2000 | Youssefmir et al. |
| 6,144,711 A | 11/2000 | Raleigh et al. |
| 6,154,661 A | 11/2000 | Goldburg |
| 6,163,296 A | 12/2000 | Lier et al. |
| 6,167,031 A | 12/2000 | Olofsson et al. |
| 6,175,588 B1 | 1/2001 | Visotsky et al. |
| 6,178,196 B1 | 1/2001 | Naguib et al. |
| 6,192,256 B1 | 2/2001 | Whinnett |
| 6,205,410 B1 | 3/2001 | Cai |
| 6,222,888 B1 | 4/2001 | Kao et al. |
| 6,232,918 B1 | 5/2001 | Wax et al. |
| 6,266,528 B1 | 7/2001 | Farzaneh |
| 6,275,543 B1 | 8/2001 | Petrus et al. |
| 6,278,726 B1 | 8/2001 | Mesecher et al. |
| 6,292,917 B1 | 9/2001 | Sinha et al. |
| 6,298,035 B1 | 10/2001 | Heiskala |
| 6,298,092 B1 | 10/2001 | Heath, Jr. et al. |
| 6,308,080 B1 | 10/2001 | Burt et al. |
| 6,314,113 B1 | 11/2001 | Guemas |
| 6,314,289 B1 | 11/2001 | Eberlein et al. |
| 6,317,612 B1 | 11/2001 | Farsakh |
| 6,330,277 B1 | 12/2001 | Gelblum et al. |
| 6,330,293 B1 | 12/2001 | Klank et al. |
| 6,330,462 B1 | 12/2001 | Chen |
| 6,333,953 B1 | 12/2001 | Bottomley et al. |
| 6,339,399 B1 | 1/2002 | Andersson et al. |
| 6,345,036 B1 | 2/2002 | Sudo et al. |
| 6,346,910 B1 | 2/2002 | Ito |
| 6,347,234 B1 | 2/2002 | Scherzer |
| 6,348,036 B1 | 2/2002 | Looney et al. |
| 6,351,499 B1 | 2/2002 | Paulraj et al. |
| 6,363,267 B1 | 3/2002 | Lindskog et al. |
| 6,369,758 B1 | 4/2002 | Zhang |
| 6,377,812 B1 | 4/2002 | Rashid-Farrokhi et al. |
| 6,385,264 B1 | 5/2002 | Terasawa et al. |
| 6,426,971 B1 | 7/2002 | Wu et al. |
| 6,452,981 B1 | 9/2002 | Raleigh et al. |
| 6,463,290 B1 | 10/2002 | Stilp et al. |
| 6,473,467 B1 | 10/2002 | Wallace et al. |
| 6,478,422 B1 | 11/2002 | Hansen |
| 6,492,942 B1 | 12/2002 | Kezys |
| 6,510,184 B1 | 1/2003 | Okamura |
| 6,512,737 B1 | 1/2003 | Agee |
| 6,515,617 B1 | 2/2003 | Demers et al. |
| 6,532,225 B1 | 3/2003 | Chang et al. |
| 6,532,255 B1 | 3/2003 | Chang et al. |
| 6,532,562 B1 | 3/2003 | Chou et al. |
| 6,545,997 B1 | 4/2003 | Bohnke et al. |
| 6,574,211 B2 | 6/2003 | Padovani et al. |
| 6,574,267 B1 | 6/2003 | Kanterakis et al. |
| 6,574,271 B2 | 6/2003 | Mesecher et al. |
| 6,594,473 B1 * | 7/2003 | Dabak et al. .................. 455/101 |
| 6,594,798 B1 | 7/2003 | Chou et al. |
| 6,597,682 B1 | 7/2003 | Kari |
| 6,608,874 B1 | 8/2003 | Beidas et al. |
| 6,611,231 B2 | 8/2003 | Crilly, Jr. et al. |
| 6,615,024 B1 | 9/2003 | Boros et al. |
| 6,631,121 B1 | 10/2003 | Yoon |
| 6,636,496 B1 | 10/2003 | Cho et al. |
| 6,636,568 B2 | 10/2003 | Kadous |
| 6,654,590 B2 | 11/2003 | Boros et al. |
| 6,654,613 B1 | 11/2003 | Maeng et al. |
| 6,668,161 B2 | 12/2003 | Boros et al. |
| 6,683,916 B1 | 1/2004 | Sartori et al. |
| 6,690,660 B2 | 2/2004 | Kim et al. |
| 6,693,992 B2 | 2/2004 | Jones et al. |
| 6,694,155 B1 | 2/2004 | Chin et al. |
| 6,697,346 B1 | 2/2004 | Halton et al. |
| 6,711,121 B1 | 3/2004 | Gerakoulis et al. |
| 6,728,233 B1 | 4/2004 | Park et al. |
| 6,731,668 B2 | 5/2004 | Ketchum |
| 6,735,188 B1 | 5/2004 | Becker et al. |
| 6,738,020 B1 | 5/2004 | Lindskog et al. |
| 6,744,811 B1 | 6/2004 | Kantschuk |
| 6,751,187 B2 | 6/2004 | Walton et al. |
| 6,751,444 B1 | 6/2004 | Meiyappan |
| 6,751,480 B2 | 6/2004 | Kogiantis et al. |
| 6,757,263 B1 | 6/2004 | Olds |
| 6,760,313 B1 | 7/2004 | Sindhushayana et al. |
| 6,760,388 B2 | 7/2004 | Ketchum et al. |
| 6,760,882 B1 | 7/2004 | Catreux et al. |

(56) References Cited

U.S. PATENT DOCUMENTS

| | | |
|---|---|---|
| 6,768,727 B1 | 7/2004 | Sourour et al. |
| 6,771,706 B2 | 8/2004 | Ling et al. |
| 6,785,341 B2 | 8/2004 | Walton et al. |
| 6,785,513 B1 | 8/2004 | Sivaprakasam |
| 6,788,948 B2 | 9/2004 | Lindskog et al. |
| 6,792,041 B1 | 9/2004 | Kim et al. |
| 6,795,424 B1 | 9/2004 | Kapoor et al. |
| 6,798,738 B1 | 9/2004 | Do et al. |
| 6,801,790 B2 | 10/2004 | Rudrapatna |
| 6,802,035 B2 | 10/2004 | Catreux et al. |
| 6,804,191 B2 | 10/2004 | Richardson |
| 6,821,535 B2 | 11/2004 | Nurmi et al. |
| 6,842,460 B1 | 1/2005 | Olkkonen et al. |
| 6,847,828 B2 | 1/2005 | Miyoshi et al. |
| 6,850,252 B1 | 2/2005 | Hoffberg |
| 6,850,498 B2 | 2/2005 | Heath et al. |
| 6,859,503 B2 | 2/2005 | Pautler et al. |
| 6,862,440 B2 | 3/2005 | Sampath |
| 6,868,079 B1 | 3/2005 | Hunt |
| 6,873,651 B2 | 3/2005 | Tesfai et al. |
| 6,879,578 B2 | 4/2005 | Pan et al. |
| 6,879,579 B1 | 4/2005 | Myles et al. |
| 6,882,868 B1 | 4/2005 | Shattil |
| 6,885,708 B2 | 4/2005 | Thomas et al. |
| 6,888,809 B1 | 5/2005 | Foschini et al. |
| 6,888,899 B2 | 5/2005 | Raleigh et al. |
| 6,891,858 B1 | 5/2005 | Mahesh et al. |
| 6,920,192 B1 * | 7/2005 | Laroia et al. ............... 375/347 |
| 6,920,194 B2 | 7/2005 | Stopler et al. |
| 6,927,728 B2 | 8/2005 | Vook et al. |
| 6,937,592 B1 | 8/2005 | Heath, Jr. et al. |
| 6,940,917 B2 | 9/2005 | Menon et al. |
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,906 B2 | 10/2005 | Tager et al. |
| 6,959,171 B2 | 10/2005 | Tsien et al. |
| 6,963,742 B2 | 11/2005 | Boros et al. |
| 6,965,762 B2 | 11/2005 | Sugar et al. |
| 6,970,722 B1 | 11/2005 | Lewis |
| 6,980,601 B2 | 12/2005 | Jones |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent et al. |
| 7,002,900 B2 | 2/2006 | Walton et al. |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,490 B2 | 3/2006 | Khatri et al. |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar et al. |
| 7,039,125 B2 | 5/2006 | Friedman |
| 7,042,858 B1 | 5/2006 | Ma et al. |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,088,671 B1 | 8/2006 | Monsen |
| 7,095,709 B2 | 8/2006 | Walton et al. |
| 7,095,722 B1 | 8/2006 | Walke et al. |
| 7,099,377 B2 | 8/2006 | Berens et al. |
| 7,103,325 B1 | 9/2006 | Jia |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano et al. |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 * | 11/2006 | Onggosanusi et al. ....... 375/267 |
| 7,137,047 B2 | 11/2006 | Mitlin et al. |
| 7,149,239 B2 | 12/2006 | Hudson et al. |
| 7,149,254 B2 | 12/2006 | Sampath |
| 7,155,171 B2 | 12/2006 | Ebert et al. |
| 7,158,563 B2 | 1/2007 | Ginis et al. |
| 7,164,649 B2 | 1/2007 | Walton et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani et al. |
| 7,260,366 B2 | 8/2007 | Lee et al. |
| 7,263,119 B1 | 8/2007 | Hsu et al. |
| 7,274,734 B2 | 9/2007 | Tsatsanis |
| 7,277,679 B1 | 10/2007 | Barratt et al. |
| 7,280,467 B2 | 10/2007 | Smee et al. |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,308,035 B2 * | 12/2007 | Rouquette et al. ............ 375/267 |
| 7,317,750 B2 | 1/2008 | Shattil |
| 7,324,429 B2 | 1/2008 | Walton et al. |
| 7,327,800 B2 * | 2/2008 | Oprea et al. ............... 375/267 |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,636,573 B2 | 12/2009 | Walton et al. |
| 7,646,747 B2 | 1/2010 | Atarashi et al. |
| 7,653,142 B2 | 1/2010 | Ketchum et al. |
| 7,653,415 B2 | 1/2010 | van Rooyen |
| 7,656,967 B2 | 2/2010 | Tiirola et al. |
| 7,778,337 B2 | 8/2010 | Tong et al. |
| 7,822,140 B2 | 10/2010 | Catreux et al. |
| 7,843,972 B2 | 11/2010 | Nakahara et al. |

(56) References Cited

U.S. PATENT DOCUMENTS

| | | | |
|---|---|---|---|
| 7,986,742 B2 | 7/2011 | Ketchum et al. | |
| 8,145,179 B2 | 3/2012 | Walton et al. | |
| 8,170,513 B2 | 5/2012 | Walton et al. | |
| 8,254,246 B2* | 8/2012 | Ma et al. | 370/208 |
| 8,260,210 B2 | 9/2012 | Esteve et al. | |
| 8,325,836 B2* | 12/2012 | Tong et al. | 375/260 |
| 8,406,118 B2* | 3/2013 | Zhu et al. | 370/208 |
| 8,462,643 B2 | 6/2013 | Walton et al. | |
| 2001/0017881 A1 | 8/2001 | Bhatoolaul et al. | |
| 2001/0031621 A1 | 10/2001 | Schmutz et al. | |
| 2001/0033623 A1* | 10/2001 | Hosur | 375/267 |
| 2001/0046205 A1 | 11/2001 | Easton et al. | |
| 2002/0003774 A1 | 1/2002 | Wang et al. | |
| 2002/0004920 A1 | 1/2002 | Cho et al. | |
| 2002/0018310 A1 | 2/2002 | Hung | |
| 2002/0018453 A1 | 2/2002 | Yu et al. | |
| 2002/0027951 A1 | 3/2002 | Gormley et al. | |
| 2002/0041632 A1 | 4/2002 | Sato et al. | |
| 2002/0041635 A1* | 4/2002 | Ma et al. | 375/267 |
| 2002/0044591 A1 | 4/2002 | Lee et al. | |
| 2002/0044610 A1 | 4/2002 | Jones | |
| 2002/0057659 A1 | 5/2002 | Ozluturk et al. | |
| 2002/0062472 A1 | 5/2002 | Medlock et al. | |
| 2002/0064214 A1 | 5/2002 | Hattori et al. | |
| 2002/0071445 A1 | 6/2002 | Wu et al. | |
| 2002/0075830 A1 | 6/2002 | Hartman, Jr. | |
| 2002/0080735 A1 | 6/2002 | Heath et al. | |
| 2002/0085620 A1 | 7/2002 | Mesecher | |
| 2002/0085641 A1 | 7/2002 | Baum | |
| 2002/0098872 A1 | 7/2002 | Judson | |
| 2002/0105928 A1 | 8/2002 | Kapoor et al. | |
| 2002/0115473 A1 | 8/2002 | Hwang et al. | |
| 2002/0122381 A1 | 9/2002 | Wu et al. | |
| 2002/0122393 A1 | 9/2002 | Caldwell et al. | |
| 2002/0126803 A1 | 9/2002 | Jones et al. | |
| 2002/0132600 A1 | 9/2002 | Rudrapatna et al. | |
| 2002/0147953 A1 | 10/2002 | Catreux et al. | |
| 2002/0150182 A1 | 10/2002 | Dogan et al. | |
| 2002/0154705 A1 | 10/2002 | Walton et al. | |
| 2002/0163879 A1 | 11/2002 | Li et al. | |
| 2002/0181390 A1 | 12/2002 | Mody et al. | |
| 2002/0183010 A1 | 12/2002 | Catreux et al. | |
| 2002/0184453 A1 | 12/2002 | Hughes et al. | |
| 2002/0191535 A1 | 12/2002 | Sugiyama et al. | |
| 2002/0193146 A1 | 12/2002 | Wallace et al. | |
| 2002/0196842 A1 | 12/2002 | Onggosanusi et al. | |
| 2003/0002450 A1 | 1/2003 | Jalali et al. | |
| 2003/0003863 A1 | 1/2003 | Thielecke et al. | |
| 2003/0007463 A1 | 1/2003 | Li et al. | |
| 2003/0012308 A1 | 1/2003 | Sampath et al. | |
| 2003/0039317 A1 | 2/2003 | Taylor et al. | |
| 2003/0043887 A1 | 3/2003 | Hudson et al. | |
| 2003/0045288 A1 | 3/2003 | Luschi et al. | |
| 2003/0048856 A1 | 3/2003 | Ketchum et al. | |
| 2003/0060173 A1 | 3/2003 | Lee et al. | |
| 2003/0072395 A1 | 4/2003 | Jia et al. | |
| 2003/0076797 A1 | 4/2003 | Lozano et al. | |
| 2003/0076812 A1 | 4/2003 | Benedittis | |
| 2003/0078024 A1 | 4/2003 | Magee et al. | |
| 2003/0086514 A1 | 5/2003 | Ginis et al. | |
| 2003/0092456 A1 | 5/2003 | Dent et al. | |
| 2003/0095197 A1 | 5/2003 | Wheeler et al. | |
| 2003/0099306 A1 | 5/2003 | Nilsson et al. | |
| 2003/0103584 A1 | 6/2003 | Bjerke et al. | |
| 2003/0112745 A1 | 6/2003 | Zhuang et al. | |
| 2003/0119452 A1 | 6/2003 | Kim et al. | |
| 2003/0123381 A1 | 7/2003 | Zhuang et al. | |
| 2003/0123389 A1 | 7/2003 | Russell et al. | |
| 2003/0125040 A1 | 7/2003 | Walton et al. | |
| 2003/0128656 A1 | 7/2003 | Scarpa | |
| 2003/0128658 A1 | 7/2003 | Walton et al. | |
| 2003/0139194 A1 | 7/2003 | Onggosanusi et al. | |
| 2003/0139196 A1 | 7/2003 | Medvedev et al. | |
| 2003/0142732 A1 | 7/2003 | Moshavi et al. | |
| 2003/0147371 A1 | 8/2003 | Choi et al. | |
| 2003/0153320 A1 | 8/2003 | Noerpel et al. | |
| 2003/0153360 A1 | 8/2003 | Burke et al. | |
| 2003/0157953 A1 | 8/2003 | Das et al. | |
| 2003/0157954 A1 | 8/2003 | Medvedev et al. | |
| 2003/0161282 A1 | 8/2003 | Medvedev et al. | |
| 2003/0162519 A1 | 8/2003 | Smith et al. | |
| 2003/0165189 A1 | 9/2003 | Kadous et al. | |
| 2003/0185311 A1 | 10/2003 | Kim | |
| 2003/0186650 A1 | 10/2003 | Liu | |
| 2003/0190897 A1 | 10/2003 | Lei et al. | |
| 2003/0202492 A1 | 10/2003 | Akella et al. | |
| 2003/0202612 A1 | 10/2003 | Halder et al. | |
| 2003/0206558 A1 | 11/2003 | Parkkinen et al. | |
| 2003/0235147 A1 | 12/2003 | Walton et al. | |
| 2003/0235149 A1 | 12/2003 | Chan et al. | |
| 2003/0235255 A1 | 12/2003 | Ketchum et al. | |
| 2004/0005887 A1 | 1/2004 | Bahrenburg et al. | |
| 2004/0017785 A1 | 1/2004 | Zelst | |
| 2004/0037257 A1 | 2/2004 | Ngo | |
| 2004/0042439 A1 | 3/2004 | Menon et al. | |
| 2004/0042556 A1 | 3/2004 | Medvedev et al. | |
| 2004/0047284 A1 | 3/2004 | Eidson | |
| 2004/0047292 A1 | 3/2004 | Du Crest et al. | |
| 2004/0052228 A1 | 3/2004 | Tellado et al. | |
| 2004/0062192 A1 | 4/2004 | Liu et al. | |
| 2004/0071104 A1 | 4/2004 | Boesel et al. | |
| 2004/0071107 A1 | 4/2004 | Kats et al. | |
| 2004/0076224 A1 | 4/2004 | Onggosanusi et al. | |
| 2004/0081131 A1 | 4/2004 | Walton et al. | |
| 2004/0082356 A1 | 4/2004 | Walton et al. | |
| 2004/0085939 A1 | 5/2004 | Wallace et al. | |
| 2004/0087324 A1 | 5/2004 | Ketchum et al. | |
| 2004/0120411 A1 | 6/2004 | Walton et al. | |
| 2004/0121730 A1* | 6/2004 | Kadous et al. | 455/13.3 |
| 2004/0136349 A1 | 7/2004 | Walton et al. | |
| 2004/0151108 A1 | 8/2004 | Blasco Claret et al. | |
| 2004/0151122 A1 | 8/2004 | Lau et al. | |
| 2004/0156328 A1 | 8/2004 | Walton | |
| 2004/0160921 A1 | 8/2004 | Kaipainen et al. | |
| 2004/0160987 A1 | 8/2004 | Sudo et al. | |
| 2004/0176097 A1 | 9/2004 | Wilson et al. | |
| 2004/0179627 A1 | 9/2004 | Ketchum et al. | |
| 2004/0184398 A1 | 9/2004 | Walton et al. | |
| 2004/0198276 A1 | 10/2004 | Tellado et al. | |
| 2004/0203853 A1 | 10/2004 | Sheynblat | |
| 2004/0252632 A1 | 12/2004 | Bourdoux et al. | |
| 2005/0002326 A1* | 1/2005 | Ling et al. | 370/208 |
| 2005/0047384 A1 | 3/2005 | Wax et al. | |
| 2005/0047515 A1 | 3/2005 | Walton et al. | |
| 2005/0099974 A1 | 5/2005 | Kats et al. | |
| 2005/0111599 A1 | 5/2005 | Walton et al. | |
| 2005/0120097 A1 | 6/2005 | Walton et al. | |
| 2005/0128953 A1 | 6/2005 | Wallace et al. | |
| 2005/0135284 A1 | 6/2005 | Nanda et al. | |
| 2005/0135295 A1 | 6/2005 | Walton et al. | |
| 2005/0135318 A1 | 6/2005 | Walton et al. | |
| 2005/0147177 A1 | 7/2005 | Seo et al. | |
| 2005/0174981 A1 | 8/2005 | Heath et al. | |
| 2005/0185575 A1 | 8/2005 | Hansen et al. | |
| 2005/0195915 A1 | 9/2005 | Raleigh et al. | |
| 2005/0208959 A1 | 9/2005 | Chen et al. | |
| 2005/0220211 A1 | 10/2005 | Shim et al. | |
| 2005/0227628 A1 | 10/2005 | Inanoglu | |
| 2005/0245264 A1 | 11/2005 | Laroia et al. | |
| 2005/0276343 A1 | 12/2005 | Jones | |
| 2006/0018247 A1 | 1/2006 | Driesen et al. | |
| 2006/0018395 A1 | 1/2006 | Tzannes | |
| 2006/0067417 A1 | 3/2006 | Park et al. | |
| 2006/0072649 A1 | 4/2006 | Chang et al. | |
| 2006/0077935 A1 | 4/2006 | Hamalainen et al. | |
| 2006/0104196 A1 | 5/2006 | Wu et al. | |
| 2006/0104340 A1 | 5/2006 | Walton et al. | |
| 2006/0114858 A1 | 6/2006 | Walton et al. | |
| 2006/0153237 A1 | 7/2006 | Hwang et al. | |
| 2006/0159120 A1 | 7/2006 | Kim | |
| 2006/0176968 A1 | 8/2006 | Keaney et al. | |
| 2006/0183497 A1 | 8/2006 | Paranchych et al. | |
| 2006/0209894 A1 | 9/2006 | Tzannes et al. | |
| 2006/0209937 A1 | 9/2006 | Tanaka et al. | |

(56) References Cited

U.S. PATENT DOCUMENTS

| | | |
|---|---|---|
| 2006/0285605 A1 | 12/2006 | Walton et al. |
| 2007/0177681 A1 | 8/2007 | Choi et al. |
| 2007/0274278 A1 | 11/2007 | Choi et al. |
| 2008/0069015 A1 | 3/2008 | Walton et al. |
| 2008/0267098 A1 | 10/2008 | Walton et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0129454 A1 | 5/2009 | Medvedev et al. |
| 2009/0161613 A1 | 6/2009 | Kent et al. |
| 2009/0291642 A1 | 11/2009 | Cozzo et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0220825 A1* | 9/2010 | Dubuc et al. .................. 375/346 |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum et al. |
| 2012/0140664 A1 | 6/2012 | Walton et al. |
| 2012/0176928 A1 | 7/2012 | Wallace et al. |
| 2012/0219093 A1* | 8/2012 | Jia et al. ...................... 375/308 |
| 2013/0235825 A1 | 9/2013 | Walton et al. |
| 2013/0279614 A1 | 10/2013 | Walton et al. |
| 2014/0036823 A1* | 2/2014 | Ma et al. ...................... 370/329 |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 | 8/2001 |
| CN | 1314037 A | 9/2001 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 | 1/1997 |
| EP | 0762701 A2 | 3/1997 |
| EP | 0772329 | 5/1997 |
| EP | 0805568 A1 | 11/1997 |
| EP | 0869647 A2 | 10/1998 |
| EP | 0895387 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 A2 | 9/2001 |
| EP | 1137217 | 9/2001 |
| EP | 1143754 | 10/2001 |
| EP | 1170879 | 1/2002 |
| EP | 1175022 A2 | 1/2002 |
| EP | 1182799 A2 | 2/2002 |
| EP | 1185001 | 3/2002 |
| EP | 1185015 | 3/2002 |
| EP | 1207635 | 5/2002 |
| EP | 1207645 A1 | 5/2002 |
| EP | 1185048 | 6/2002 |
| EP | 1223702 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 A2 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 03104430 | 5/1991 |
| JP | 06003956 | 1/1994 |
| JP | 06501139 | 1/1994 |
| JP | 08274756 | 10/1996 |
| JP | 9135230 | 5/1997 |
| JP | 9266466 A | 10/1997 |
| JP | 9307526 | 11/1997 |
| JP | 09327073 | 12/1997 |
| JP | 9512156 T | 12/1997 |
| JP | 1028077 | 1/1998 |
| JP | 10051402 A | 2/1998 |
| JP | 10084324 | 3/1998 |
| JP | 10209956 | 8/1998 |
| JP | 10303794 A | 11/1998 |
| JP | 10327126 | 12/1998 |
| JP | 1132027 | 2/1999 |
| JP | 1141159 | 2/1999 |
| JP | 2991167 | 3/1999 |
| JP | 11069431 A | 3/1999 |
| JP | 11074863 | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504336 A | 2/2006 |
| JP | 2006504372 | 2/2006 |
| JP | 4860925 | 11/2011 |
| KR | 200011799 | 2/2000 |
| KR | 20010098861 | 11/2001 |
| KR | 1020020003370 | 1/2002 |
| KR | 20030085040 | 11/2003 |
| KR | 2006-0095576 | 8/2006 |
| RU | 2015281 C1 | 6/1994 |
| RU | 2111619 | 5/1998 |
| RU | 2134489 | 8/1999 |
| RU | RU2139633 | 10/1999 |
| RU | 2141168 C1 | 11/1999 |
| RU | 2149509 | 5/2000 |
| RU | 2152132 C1 | 6/2000 |
| RU | 2157592 | 10/2000 |
| RU | 2158479 | 10/2000 |
| RU | 2158479 C2 | 10/2000 |
| RU | 2168277 | 5/2001 |
| RU | 2168278 | 5/2001 |

(56) References Cited

FOREIGN PATENT DOCUMENTS

| | | |
|---|---|---|
| RU | 2197781 C2 | 1/2003 |
| RU | 2201034 | 3/2003 |
| RU | 2335852 | 1/2006 |
| TW | 419912 | 1/2001 |
| TW | 496620 | 7/2002 |
| TW | 503347 | 9/2002 |
| TW | 200300636 | 6/2003 |
| TW | 545006 B | 8/2003 |
| TW | 567689 | 12/2003 |
| TW | 567701 | 12/2003 |
| TW | 583842 B | 4/2004 |
| TW | I230525 | 4/2005 |
| TW | I263449 | 10/2006 |
| TW | I267251 B | 11/2006 |
| WO | WO8607223 | 12/1986 |
| WO | WO9210890 A1 | 6/1992 |
| WO | WO9307684 A1 | 4/1993 |
| WO | WO9507578 | 3/1995 |
| WO | 9516319 A1 | 6/1995 |
| WO | 9521501 A1 | 8/1995 |
| WO | 9530316 | 11/1995 |
| WO | 9532567 | 11/1995 |
| WO | WO9622662 A1 | 7/1996 |
| WO | WO9635268 | 11/1996 |
| WO | 9702667 | 1/1997 |
| WO | 9719525 | 5/1997 |
| WO | WO9736781 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 | 7/1998 |
| WO | WO9857472 | 12/1998 |
| WO | WO9903224 A1 | 1/1999 |
| WO | WO9914878 | 3/1999 |
| WO | WO9916214 | 4/1999 |
| WO | WO9929049 A2 | 6/1999 |
| WO | 9944379 | 9/1999 |
| WO | WO9952224 A1 | 10/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | 0105067 | 1/2001 |
| WO | 01005067 | 1/2001 |
| WO | WO0126269 A1 | 4/2001 |
| WO | WO0163775 A2 | 8/2001 |
| WO | WO0169801 A2 | 9/2001 |
| WO | WO0171928 | 9/2001 |
| WO | 0176110 | 10/2001 |
| WO | WO0180510 | 10/2001 |
| WO | WO0182521 A2 | 11/2001 |
| WO | WO0195531 A2 | 12/2001 |
| WO | WO0197400 A2 | 12/2001 |
| WO | 0205506 | 1/2002 |
| WO | WO0201732 A2 | 1/2002 |
| WO | WO0203557 | 1/2002 |
| WO | WO0215433 A1 | 2/2002 |
| WO | 0225853 | 3/2002 |
| WO | 02025853 | 3/2002 |
| WO | WO0260138 A2 | 8/2002 |
| WO | WO0262002 A1 | 8/2002 |
| WO | WO02065664 A2 | 8/2002 |
| WO | 0269590 | 9/2002 |
| WO | 02069590 | 9/2002 |
| WO | 02073869 | 9/2002 |
| WO | WO02069523 | 9/2002 |
| WO | WO02075955 | 9/2002 |
| WO | 02078211 | 10/2002 |
| WO | WO02082689 A2 | 10/2002 |
| WO | WO0288656 | 11/2002 |
| WO | WO02093784 A1 | 11/2002 |
| WO | WO02099992 A1 | 12/2002 |
| WO | 03010984 | 2/2003 |
| WO | WO03010994 A1 | 2/2003 |
| WO | 03019984 | 3/2003 |
| WO | WO03028153 A1 | 4/2003 |
| WO | WO03034646 A2 | 4/2003 |
| WO | WO03047140 A1 | 6/2003 |
| WO | WO03075479 | 9/2003 |
| WO | WO2004002011 | 12/2003 |
| WO | WO2004002047 | 12/2003 |
| WO | 2004039011 | 5/2004 |
| WO | WO2004038985 A2 | 5/2004 |
| WO | WO2004038986 | 5/2004 |
| WO | WO2004039022 | 5/2004 |
| WO | WO05041515 | 5/2005 |
| WO | WO05043855 | 5/2005 |
| WO | WO2005046113 A2 | 5/2005 |

OTHER PUBLICATIONS

International Search Report—International Search Authority—European Patent Office PCT/US03/033905 Feb. 6, 2004.

International Preliminary Examination Report-PCT/US03/033905, IPEA/US—Oct. 18, 2004.

Chen, K.C. et al., "Novel Space-Time Processing of DS/CDMA Multipath Signal," IEEE 49th, Vehicular Technology Conference, Houston, Texas, May 16-20, 1999, pp. 1809-1813.

ETSI TS 101 761-1 v1.3.1, "Broadband Radio Access Networks (BRAN); HIPERLAN Type 2; Data Link Control (DLC) Layer; Part 1: Basic Data Transport Functions," ETS Standards, European Telecommunications Standards Institute BR (V131), pp. 1-88 (Dec. 2001).

IEEE Std 802.11a-1999 (Supplement to IEEE Std 801.Nov. 1999) "Part 11: Wireless LAN Medium Access Control (MAC) and Physical Layer (PHY) specifications: High-Speed physical Layer in the 5GHZ Band", pp. 1-90, Sep. 1999.

Warner, W. et al.: "OFDM/FM Frame Synchronization for Mobile Radio Data Communication", IEEE Transactions on Vehicular Technology, vol. 42 , No. 3, pp. 302-313.

M.A. Kousa, et al., "Multichannel adaptive system," IEE Proceedings-I, vol. 140, No. 5, Oct. 1993, rages 357-364.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

Diggavi, S. et al., "Intercarrier interference in MIMO OFDM," IEEE International Conference on Communications, 2002, vol. 1, 485-489.

European Search Report—EP09171254, Search Authority—The Hague Patent Office, Mar. 9, 2010.

Iserte et al., "Joint beamforming strategies in OFDM-MIMO systems," 2002, sections 2 and 3, Department of Signal Theory and Communications.

Lebrun G., et al., "MIMO transmission over a time varying TDD channel using SVD," Electronics Letters, 2001, vol. 37, 1363-1364.

Li et al., "Simplified Channel Estimation for OFDM Systems with Multiple Transmit Antennas," IEEE Transactions on Wireless Communications, Jan. 2002, vol. 1, No. 1, 67-75.

Sampath H., et al., "Joint transmit and receive optimization for high data rate wireless communication using multiple antennas, XP010373976," 2002, 215-219.

Taiwanese Search Report for Application No. 092129817, TIPO filed on Oct. 31, 2010.

Wong K. K., et al., "Optimizing time and space MIMO antenna system for frequency selective fading channels," 2001, Sections II and III and V, 1396.

Chung, J. et al: "Multiple antenna systems for 802.16 systems." IEEE 802.16 Broadband Wireless Access Working Group <http://ieee802.org/16>, IEEE 802.16abc-01/31, Sep. 7, 2001.

European Search Report—EP08012143.7, Search Authority—Munich Patent Office, Jan. 19, 2011.

European Search Report—EP10173988, Search Authority—Munich Patent Office, Jan. 14, 2011.

Gore D. A., et al: "Selecting an optimal set of transmit antennas for a low rank matrix channel," 2000 IEEE International Conference on Acoustics, Speech, and Signal Processing. Proceedings. (ICASSP).

(56) References Cited

OTHER PUBLICATIONS

Istanbul, Turkey, June 5-9, 2000, New York, NY; IEEE, US, vol. 5 of 6, Jun. 5, 2000, pp. 2785-2788, XP001035763, abstract.
The Authoritative Dictionary of IEEE Standards Terms, Seventh Edition, IEEE Press: New York (Dec. 2000), p. 902.
Wong, Cheong. et al., "Multiuser OFDM with Adaptive Subcarrier, Bit and Power Allocation," Oct. 1999, IEEE Journal on Selected Areas in Communications, vol. 17, No. 10, pp. 1747-1758.
European Search Report—EP10173988—Search Authority—Munich—Mar. 15, 2011.
Translation of Office Action in Canadian Application 2501634 corresponding to US Appl. No. 10/610,446, citing CA2690247 dated Feb. 25, 2011.
Translation of Office Action in Japanese Application 2005-501686 corresponding to US Appl. No. 10/375,162, citing JP09135230 dated Feb. 15, 2011.
Grunheid et al., "Adaptive Modulation and Multiple Access for the OFDM Transmission Technique", Wireless Personal Communications 13: May 13, 2000, 2000 Kluwer Academic Publishers, pp. 4-13.
Office Action dated Aug. 13, 2008 for Australian Application Serial No. 2004223374, 2 pages.
Office Action dated Jun. 27, 2008 for Chinese Application Serial No. 200480011307.6, 3 pages.
Strang Gilbert:. "Linear Algebra and Its Applications," Second Edition, Academic Press, 1980.
Wyglinski Physical Layer Loading Algorithms for Indoor Wireless Multicarrier Systems, p. 109 Nov. 2004.
European Search Report—EP11173875—Search Authority—Hague—Oct. 25, 2011.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI : 10.1109/ACSSC.1996.600812, p. 35, col. 2, paragraph 4 through p. 36, col. 1.
Vook, F. W. et al., "Adaptive antennas for Ofdm", Vehicular Technology Conference, vol. 1, 18-21 May 1998, pp. 606-610, XP010287858, New York, Ny, Usa, IEEE, US.
DOI: 10.1109/VETEC.1998.686646 ISBN: 978-0/7803-4320-7.
Partial European Search Report—EP10012069—Search Authority—The Hague—Nov. 29, 2011.
G. Bauch, J. Hagenauer, "Smart Versus Dumb Antennas—Capacities and FEC Performance," IEEE Communications Letters, vol. 6, No. 2, pp. 55-57, Feb. 2002.
3rd Generation Partnership Project (3GPP); Technical Specification Group (TSG); Radio Access Network (RAN); RF requirements for 1.28Mcps UTRA TDD option, 3GPP Standard; 3G TR 25.945, 3rd Generation Partnership Project (3GPP), Mobile Competence Centre; 650, Route Des Lucioles; F-06921 Sophia-Antipolis Cedex; France, No. V2.0.0, Dec. 20, 2000, pp. 1-144, XP050400193, [retreived on Dec. 20, 2000], p. 126.
3rd Generation Parthership Project; Technical Specification Group Radio Access Network; Radio Resource Control (RRC); Protocol Specifiation (Release 5), 3GPP Standard; 3GPP TS 25.331, 3rd Generation Partnership Project (3GPP), Mobile Competence Centre; 650, Route Des Lucioles; F-06921 Sophia-Antipolis Cedex; France, No. V5.2.0, Sep. 1, 2002, pp. 1-938, XP050367950, pp. 124, 358—p. 370.
"3rd Generation Partnership Project; Technical Specification Group Radio Access 6-18, Network; Physical channels and mapping of 21-24 transport channels onto physical channels (TDD) (Release 5 ) " , 3GPP Standard; 3GPP TS 25.221, 3rd Generation Partnership Project (3GPP), Mobile Competence Centre; 650, Route Des Lucioles; F-06921 Sophia-Antipolis Cedex ; France, No. V5.2.0, Sep. 1, 2002, pp. 1-97, XP050366967.

European Search Report—EP10180324—Search Authority—Munich—May 10, 2012.
Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 978-0/7803-7147-7.
Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.
Catreux S., et al., "Simulation results for an interference-limited multiple input multiple output cellular system". Global Telecommmunications letters. IEEE: U.S.A. Nov. 2000. vol. 4(11), pp. 334-336.
Nogueroles R et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998, pp. 37-43, XP010277032, DOI: 10.1109/IZSBC.1998.670242 ISBN: 978-0/7803-3893-7 * p. 1-2 *.
Sakaguchi et al, "Comprehensive Calibration for MIMO System", International Symposium on Wireless Personal Multimedia Communications, IEEE, vol. 2, Oct. 27, 2002, pp. 440-443.
Varanasi M K et al., "Optimum decision feedback multiuser equalization with successive decoding achieves the total capacity of the Gaussian multiple-access channel ", Signals, Systems & Computers, 1997. Conference Record of the Thirty-First ASILOMAR Conference on Pacific Grove, CA, USA Nov. 2-5, 1997, Los Alamitos, CA, USA, IEEE Comput. Soc, US, vol. 2, Nov. 2, 1997, pp. 1405-1409, XP010280667, DOI: 10.1109/ACSSC.1997.679134 ISBN: 978-0/8186-8316-9 * pp. 1,3,5; figures 1,3 *.
Alamouti, S.M., "A Simple Transmit Diversity Technique for Wireless Communications," IEEE Journal on Select Areas in Communications, vol. 16, No. 8, Oct. 1998, pp. 1451-1458.
Chen, K.C. et al., "Novel Space—Time Processing of DS/CDMA Multipath Signal," IEEE 49th, Vehicular Technology Conference, Houston, Texas, May 16-20, 1999, pp. 1809-1813.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
Fuji!, M.: "Pseudo-Orthogonal Multibeam-Time Transmit Diversity for OFDM-CDMA" pp. 222-226 (2002).
Haustein, T. et al.: "Performance of MIMO Systems with Channel Inversion," IEEE 55th Vehicular Technology Conference, Birmingham, Alabama, May 6-9 (2002), pp. 35-39.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11 (2001), pp. 1508-1512.
Tarighat, A. et al.: "Performance Analysis of Different Algorithms for cdma2000 Antenna Array System and a New Multi User Beamforming (MUB) Algorithm", Wireless Communications and Networking Conference, pp. 409-414 Sep. 2000.
Thoen, S. et al.: "Improved Adaptive Downlink for OFDM/SDMA-Based Wireless Networks," IEEE VTS 53rd Vehicular Technology Conference, pp. 707-711, Rhodes, Greece, May 6-9, (2001).

(56) References Cited

OTHER PUBLICATIONS

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinky, Finland, Jun. 11-14 (2001).

Van Zelst, A. et al.: "Space Division Multiplexing (SDM) for OFDM Systems," IEEE 51st Vehicular Technology Conference Proceedings, pp. 1070-1074, Tokyo, Japan, May 15-18 (2000).

Warner, W. et al.: "OFDM/FM Frame Synchronization for Mobile Radio Data Communication", IEEE Transactions on Vehicular Technology, vol. 42 , No. 3, pp. 302-313, Aug. 1993.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.

Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002, vol. 2, Jun. 16, 2002, pp. 644-647, XP010591780, DOI: 10.1109/APS.2002.1016729, ISBN: 978-0/7803-7330-3.

Yamamura, T et al., "High Mobility OFDM transmission system by a new channel estimation and ISI cancellation scheme using characteristics of pilot symbol inserted OFDM signal". Vehicular Technology Conference, vol. 1, Sep. 19, 1999-Sep. 22, 1999, pp. 319-323, XP010352958 IEEE, Piscataway, NJ, USA, ISBN: 0-7803-5435-4.

Editor: 3GPP Draft; 3rd Generation Partnership Project (3GPP), Technical Specification Group (TSG) Radio Access Network (RAN); Working Group 4(WG4); base Station conformance and testing", TS 25.141 V0.1.1 (May 1999)", R4-99349, Mobile Competence Centre; 650, Route Des Lucioles; F-06921 Sophia-Antipolis Cedex; France, vol. RAN WG4, No. Miami; Oct. 24, 2001, XP050166323.

EPO Communication pursuant to Article 94(3) EPC issued by the European Patent Orifice for Application No. 10174926.5 dated Aug. 1, 2013.

EPO Communication pursuant to Article 94(3) EPC issued by the European Patent Orifice for Application No. 10174932.3 dated Jul. 30, 2013.

Lal D et al: "A novel MAC layer protocol for space division multiple access in wireless ad hoc networks", Computer Communications and Networks, 2002 Proceedings, Eleventh International Conference on Oct. 14, 2002, pp. 614-619.

Technical Search Report issued by the Taiwan Patent Office for TW Application No. 098143050, dated Aug. 2, 2013.

3GPP2 TIA/EIA/IS-2000-2-A, "Physical Layer Standard for cdma2000 Spread Spectrum Systems", (Nov. 19, 1999).

B. Hassibi, et al. "High-Rate Codes that are Linear in Space and Time," LUCENT Technologies, Murray Hill, NY (USA), Aug. 22, 2000, (pp. 1-54).

Choi, R. et al., "MIMO Transmit Optimization for Wireless Communication Systems," Proceedings of the First IEEE International workshops on Electronic Design, pp. 1-6, Piscataway, New Jersey, Jan. 29-31 (2002).

Gao, et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, Sep. 24-28, 2002, IEEE Vehicular Technology Con.

Hayashi, K, A New Spatio-Temporal Equalization Method Based on Estimated Channel Response, Sep. 2001, IEEE Transaction on Vehicular Technology, vol. 50, Issue 5, pp. 1250-1259.

Bingham, "Multicarrier Modulation for Data Transmission: An Idea Whose Time Has Come," IEEE Communications Magazines, May 1990 (pp. 5-13).

Jongren et al., "Utilizing Quantized Feedback Information in Orthogonal Space-Time Block Coding," 2000 IEEE Global Telecommunications Conference, 2(4): 995-999, Nov. 27, 2000.

Kiessling, et al., "Short-Term and Long Term Diagonalization of Correlated MIMO Channels with Adaptive Modulation," IEEE Conference, vol. 2, (Sep. 15, 2002), pp. 593-597.

L. Deneire, et al. "A Low Complexity ML Channel Estimator for OFDM," Proc IEEE ICC June 2001 pp. 1461-1465.

Miyashita, et al., "High Data-Rate Transmission with Eigenbeam-Space Division Multiplexing (E-SDM) in a MIMO Channel," VTC 2002-Fall. 2002 IEEE 56th. Vehicular Technology Conference Proceedings. Vancouver, Canada, Sep. 24-28, 2002, IEEE Vehicular Technology.

P.W. Wolniansky, et al. "V-Blast: An Architecture for Realizing Very High Data Rates Over the Rich-Scattering Wireless Channel," Lucent Technologies, Holmdel, NJ, 1998.

S. M. Alamouti "A Simple Transmit Diversity Technique for Wireless Communications" IEEE Journal on Select Areas in Communications, Oct. 1998, vol. 16, No. 8, pp. 1451-1458.

Dae-Ko Hong, Young-Jo Lee, Daesik Hong, and Chang-Eon Kang. "Robust frequency offset estimation for pilot symbol assisted packet CDMA with MIMO antenna systems." Communications Letters. IEEE. Jun. 2002.

S.W. Wales, A MIMO technique within the UTRA TDD standard Jun. 22, 2005.

* cited by examiner

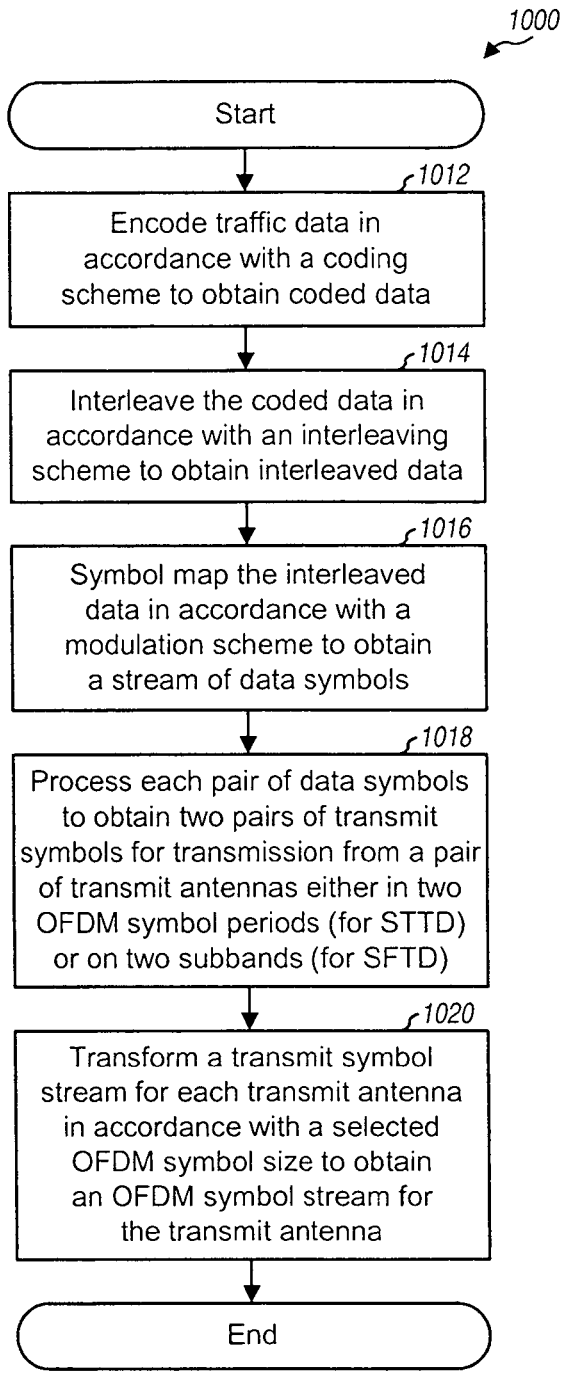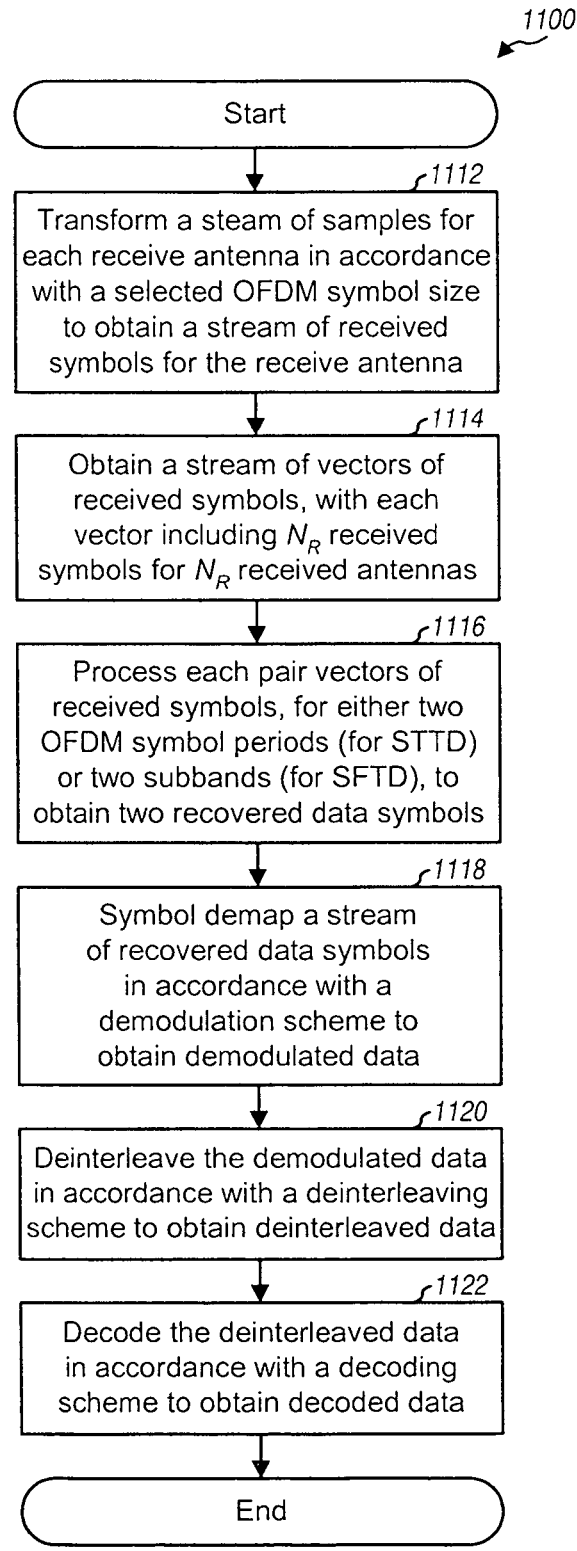
FIG. 10
FIG. 11

TRANSMIT DIVERSITY PROCESSING FOR A MULTI-ANTENNA COMMUNICATION SYSTEM

CLAIM OF PRIORITY UNDER 35 U.S.C. §120

The present Application for Patent is a Continuation of, and claims priority from, U.S. patent application Ser. No. 10/674,038 filed Sep. 29, 2003, now U.S. Pat. No. 7,002,900, issued Feb. 21, 2006 and entitled "TRANSMIT DIVERSITY PROCESSING FOR A MULTI-ANTENNA COMMUNICATION SYSTEM", which claims the benefit of priority from U.S. Provisional Patent Application Ser. No. 60/421,309, filed Oct. 25, 2002 and entitled "MIMO WLAN SYSTEM," both of which are assigned to the assignee hereof and hereby expressly incorporated by reference herein.

BACKGROUND

I. Field

The present invention relates generally to communication, and more specifically to techniques for processing data for transmit diversity in a multi-antenna communication system.

II. Background

A multi-antenna communication system employs multiple ($N_T$) transmit antennas and one or more ($N_R$) receive antennas for data transmission. The $N_T$ transmit antennas may be used to increase system throughput by transmitting independent data streams from these antennas. The $N_T$ transmit antennas may also be used to improve reliability by transmitting a single data stream redundantly from these antennas.

A multi-antenna system may also utilize orthogonal frequency division multiplexing (OFDM). OFDM is a modulation technique that effectively partitions the overall system bandwidth into multiple ($N_F$) orthogonal subbands. Each subband is associated with a respective subcarrier that may be modulated with data. The subbands are also commonly referred to as tones, subcarriers, bins, and frequency channels.

For a multi-antenna system, a propagation path exists between each pair of transmit and receive antennas. $N_T \cdot N_R$ propagation paths are formed between the $N_T$ transmit antennas and the $N_R$ receive antennas. These propagation paths may experience different channel conditions (e.g., different fading, multipath, and interference effects) and may achieve different signal-to-noise-and-interference ratios (SNRs). The channel responses of the $N_T \cdot N_R$ propagation paths may thus vary from path to path. For a dispersive communication channel, the channel response for each propagation path also varies across the $N_F$ subbands. Since the channel conditions may vary over time, the channel responses for the propagation paths may vary likewise.

Transmit diversity refers to the transmission of data redundantly across space, frequency, time, or a combination of these three dimensions, to improve the reliability of the data transmission. One goal of transmit diversity is to maximize diversity for the data transmission across as many dimensions as possible to achieve robust performance. Another goal is to simplify the processing for transmit diversity at both a transmitter and a receiver. There is therefore a need in the art for techniques to efficiently process data for transmit diversity in a multi-antenna system.

SUMMARY

Techniques for performing transmit diversity processing in a multi-antenna OFDM system are provided herein. A transmitter encodes traffic data in accordance with a coding scheme to obtain coded data. The coding scheme may comprise a fixed rate base code and a set of repetition and/or puncturing patterns for a set of code rates supported by the system. The transmitter interleaves the coded data in accordance with an interleaving scheme to obtain interleaved data. The transmitter next symbol maps the interleaved data in accordance with a modulation scheme to obtain a stream of data symbols. The system may support multiple OFDM symbol sizes for improved efficiency. The same or similar coding, interleaving, and modulation schemes may be used for different OFDM symbol sizes to simplify the processing at the transmitter and receiver.

The transmitter processes each pair of data symbols to obtain two pairs of transmit symbols for transmission from a pair of transmit antennas. Each transmit symbol is a version of a data symbol. The two pairs of transmit symbols may be transmitted from the pair of antennas either (1) on the same subband in two OFDM symbol periods for space-time transmit diversity (STTD) or (2) on two subbands in the same OFDM symbol period for space-frequency transmit diversity (SFTD). If $N_T$ transmit antennas are available for data transmission, then $N_T \cdot (N_T-1)/2$ different pairs of antennas may be used to transmit the stream of data symbols. The transmitter transforms (e.g., performs OFDM modulation on) the stream of transmit symbols for each transmit antenna in accordance with a selected OFDM symbol size to obtain a corresponding stream of OFDM symbols for the transmit antenna.

The receiver performs the complementary processing to recover the traffic data, as described below. Various aspects and embodiments of the invention are described in further detail below.

BRIEF DESCRIPTION OF THE DRAWINGS

FIG. 10 shows a process for performing transmit diversity processing at a transmitter; and FIG. 11 shows a process for performing data reception with transmit diversity at a receiver.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The transmit diversity processing techniques described herein may be used for (1) a multiple-input single-output (MISO) system with multiple transmit antennas and a single receive antenna and (2) a multiple-input multiple-output (MIMO) system with multiple transmit antennas and multiple receive antennas. These techniques may also be used for the downlink as well as the uplink. The downlink (i.e., forward link) is the communication link from an access point (e.g., a base station) to a user terminal (e.g., a mobile station), and the uplink (i.e., reverse link) is the communication link from the user terminal to the access point. For clarity, these techniques are described for the downlink in an exemplary multi-antenna system that utilizes OFDM. For this exemplary system, the access point is equipped with four antennas and each user terminal is equipped with one or more antennas.

Figure 1:
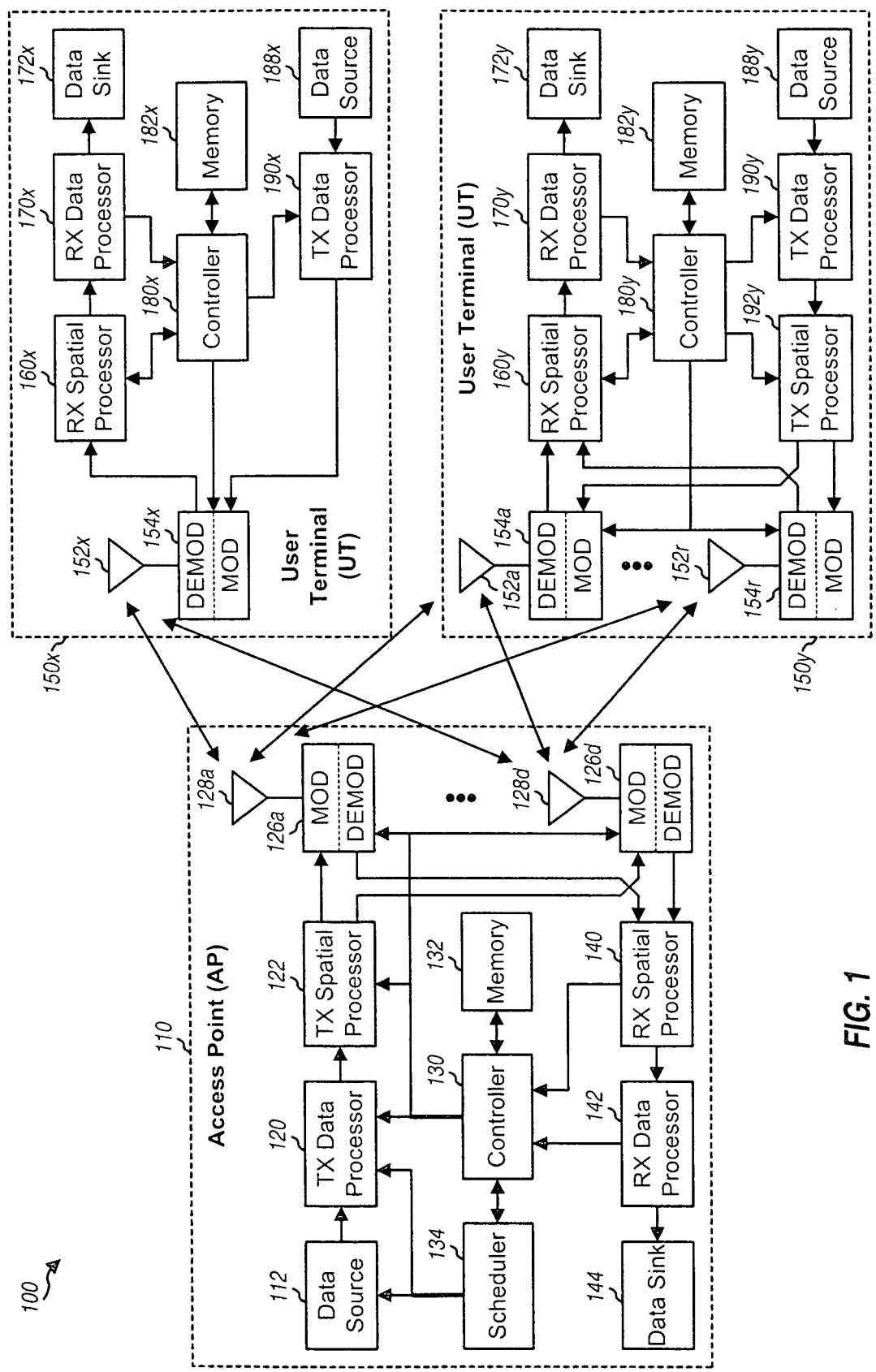
FIG. 1 shows an access point and two user terminals in a multi-antenna OFDM system.

FIG. 1 shows a block diagram of an embodiment of an access point 110 and two user terminals 150x and 150y in a multi-antenna OFDM system 100. User terminal 150x is equipped with a single antenna 152x, and user terminal 150y is equipped with multiple antennas 152a through 152r.

On the downlink, at access point 110, a transmit (TX) data processor 120 receives traffic data (e.g., information bits) from a data source 112, control data from a controller 130, and possibly other data from a scheduler 134. The various types of data may be sent on different transport channels. TX data processor 120 processes (e.g., frames, scrambles, encodes, interleaves, and symbol maps) the different types of data based on one or more coding and modulation schemes to obtain a stream of modulation symbols. As used herein, a "data symbol" refers to a modulation symbol for data, and a "pilot symbol" refers to a modulation symbol for pilot. A TX spatial processor 122 receives the data symbol stream from TX data processor 120, performs spatial processing on the data symbols for transmit diversity, multiplexes in pilot symbols, and provides one stream of transmit symbols for each transmit antenna. The processing by TX data processor 120 and TX spatial processor 122 is described below.

Each modulator (MOD) 126 receives and processes a respective transmit symbol stream to obtain a stream of OFDM symbols and further conditions (e.g., amplifies, filters, and frequency upconverts) the OFDM symbol stream to generate a downlink signal. Four downlink signals from four modulators 126a through 126d are transmitted from four antennas 128a through 128d, respectively, to the user terminals.

At each user terminal 150, one or multiple antennas 152 receive the transmitted downlink signals, and each antenna provides a received signal to a respective demodulator (DEMOD) 154. Each demodulator 154 performs processing complementary to that performed at modulator 126 and provides a stream of received symbols. A receive (RX) spatial processor 160 performs spatial processing on the received symbol streams from all demodulators 154 to obtain a stream of recovered data symbols, which is an estimate of the stream of data symbols transmitted by access point 110. An RX data processor 170 receives and demultiplexes the recovered data symbols into their respective transport channels. The recovered data symbols for each transport channel are then processed (e.g., demapped, deinterleaved, decoded, and descrambled) to obtain decoded data for that transport channel. The decoded data for each transport channel may include recovered user data, control data, and so on, which may be provided to a data sink 172 for storage and/or a controller 180 for further processing.

At each user terminal 150, a channel estimator (not shown in FIG. 1) estimates the downlink channel response and provides channel estimates, which may include channel gain (or path gain) estimates, SNR estimates, and so on. RX data processor 170 may also provide the status of each packet/frame received on the downlink. Controller 180 receives the channel estimates and the packet/frame status and assembles feedback information for access point 110. The feedback information and uplink data are processed by a TX data processor 190, spatially processed by a TX spatial processor 192 (if present at user terminal 150), multiplexed with pilot symbols, conditioned by one or more modulators 154, and transmitted via one or more antennas 152 to access point 110.

At access point 110, the transmitted uplink signal(s) are received by antennas 128, demodulated by demodulators 126, and processed by an RX spatial processor 140 and an RX data processor 142 in a complementary manner to that performed at user terminal 150. The recovered feedback information is provided to controller 130 and scheduler 134. Scheduler 134 may use the feedback information to perform a number of functions such as (1) scheduling a set of user terminals for data transmission on the downlink and uplink and (2) assigning the available downlink and uplink resources to the scheduled terminals.

Controllers 130 and 180 control the operation of various processing units at access point 110 and user terminal 150, respectively. For example, controller 180 may determine the maximum rate supported by the downlink for user terminal 150. Controller 130 may select the rate, payload size, and OFDM symbol size for each scheduled user terminal.

The processing at access point 110 and user terminal 150 for the uplink may be the same or different from the processing for the downlink.

System 100 utilizes a set of transport channels to transmit different types of data. In an exemplary design, on the downlink, access point 110 transmits system information on a broadcast channel (BCH), control data on a forward control channel (FCCH), and traffic data to specific user terminals on a forward channel (FCH). On the uplink, user terminal 150 transmits access data and messages on a random access channel (RACH) and traffic data on a reverse channel (RCH). Other system designs may use different and/or other transport channels. Transmit diversity may be used for each of the transport channels.

Figure 2:
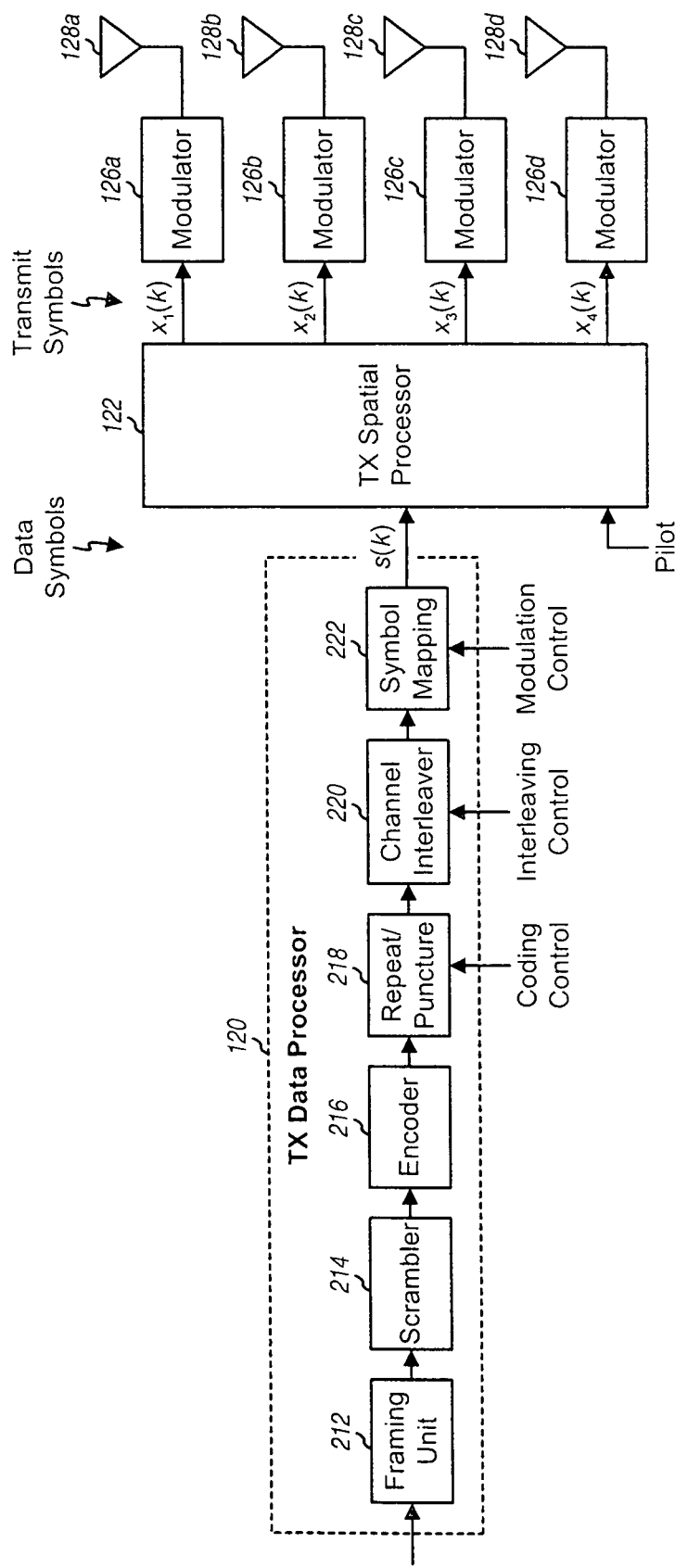
FIG. 2 shows the transmitter portion of the access point.

FIG. 2 shows a block diagram of the transmitter portion of access point 110. Within TX data processor 120, a framing unit 212 formats each data packet, for example, by generating a cyclic redundancy check (CRC) value and appending a header for the packet. The CRC value may be used by a receiver to determine whether the packet is decoded correctly or in error. The framing may be performed for some transport channels and omitted for other transport channels. The framing may also be different for different transport channels. Each packet is coded and modulated separately and designated for transmission over a particular time duration (e.g., one or more OFDM symbol periods). A scrambler 214 scrambles the framed/unframed data to randomize the data.

An encoder 216 encodes the scrambled data in accordance with a coding scheme and provides code bits. The encoding increases the reliability of the data transmission. A repeat/puncture unit 218 then repeats or punctures (i.e., deletes) some of the code bits to obtain the desired code rate for each packet. In an embodiment, encoder 216 is a rate 1/2 binary convolutional encoder. A code rate of 1/4 may be obtained by repeating each code bit once. Code rates greater than 1/2 may be obtained by deleting some of the code bits from encoder 216. An interleaver 220 interleaves (i.e., reorders) the code bits from repeat/puncture unit 218 based on an interleaving scheme. The interleaving provides time, frequency, and/or spatial diversity for the code bits.

A symbol mapping unit 222 maps the interleaved data in accordance with a selected modulation scheme and provides data symbols. The symbol mapping may be achieved by (1) grouping sets of B bits to form B-bit binary values, where $B \geq 1$, and (2) mapping each B-bit binary value to a point in a signal constellation corresponding to the selected modulation scheme. Each mapped signal point is a complex value and corresponds to a data symbol. Symbol mapping unit 222 provides a stream of data symbols to TX spatial processor 122.

Exemplary designs for encoder 216, repeat/puncture unit 218, interleaver 220, and symbol mapping unit 222 are described below. The encoding, interleaving, and symbol mapping may be performed based on control signals provided by controller 130.

TX spatial processor 122 receives the stream of data symbols from TX data processor 120 and performs spatial processing for transmit diversity, as described below. TX spatial processor 122 provides one stream of transmit symbols to each of four modulators 126a through 126d for the four transmit antennas.

Figure 3:
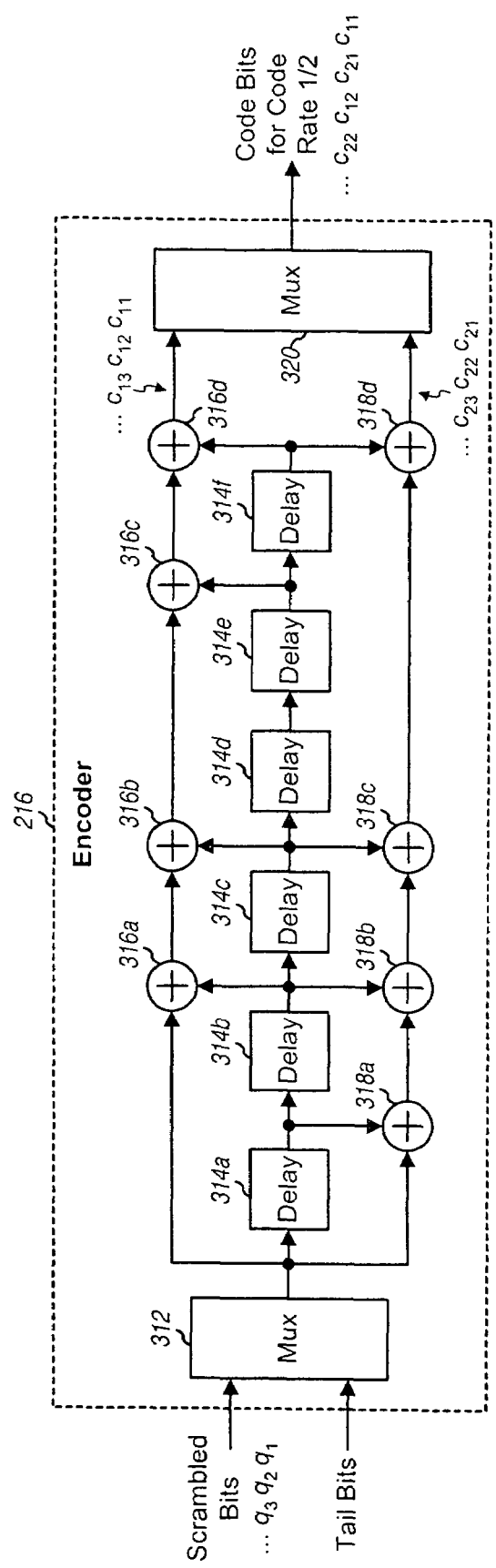
FIG. 3 shows an encoder.

FIG. 3 shows an embodiment of encoder 216, which implements a base code for the system. In this embodiment, the base code is a rate 1/2, constraint length 7 (K=7) convolutional code with generators of 133 and 171 (octal).

Within encoder 216, a multiplexer 312 receives the scrambled bits for each packet from scrambler 214 and tail bits (e.g., zeros) and provides the scrambled bits first followed by six tail bits. Encoder 216 also includes six delay elements 314a through 314f coupled in series. Four adders 316a through 316d are also coupled in series and used to implement the first generator (133). Similarly, four adders 318a through 318d are coupled in series and used to implement the second generator (171). The adders are further coupled to delay elements 314 in a manner to implement the two generators of 133 and 171, as shown in FIG. 3.

The scrambled bits are provided to the first delay element 314a and to adders 316a and 318a. For each clock cycle, adders 316a through 316d perform modulo-2 addition of the incoming bit and four prior bits stored in delay elements 314b, 314c, 314e, and 314f to obtain the first code bit for that clock cycle. Similarly, adders 318a through 318d perform modulo-2 addition of the incoming bit and four prior bits stored in delay elements 314a, 314b, 314c, and 314f to obtain the second code bit for that clock cycle. A multiplexer 320 receives and multiplexes the two streams of code bits from the two generators into a single stream of code bits. For each scrambled bit $q_n$, where n is a bit index, two code bits $c_{1n}$ and $c_{2n}$ are generated, which results in a code rate of 1/2.

System 100 supports a set of "rates" for data transmission. Table 1 lists an exemplary set of 14 rates supported by the system, which are identified by rate indices 0 through 13. The rate having index 0 is for a null data rate (i.e., no data transmission). Each of the non-zero rate is associated with a particular spectral efficiency, a particular code rate, a particular modulation scheme, and a particular minimum SNR required to achieve the desired level of performance (e.g., 1% packet error rate (PER)) for a non-fading AWGN channel. Spectral efficiency refers to the data rate (i.e., the information bit rate) normalized by the system bandwidth, and is given in units of bits per second per Hertz (bps/Hz). The spectral efficiency for each rate is determined by the coding scheme and the modulation scheme for that rate. The code rate and modulation scheme for each rate in Table 1 are specific to the exemplary system.

Encoder 216 encodes each packet and generates rate 1/2 code bits based on a single base code. All other code rates supported by the system (as listed in Table 1) may be obtained by either repeating or puncturing the code bits.

Figure 4:
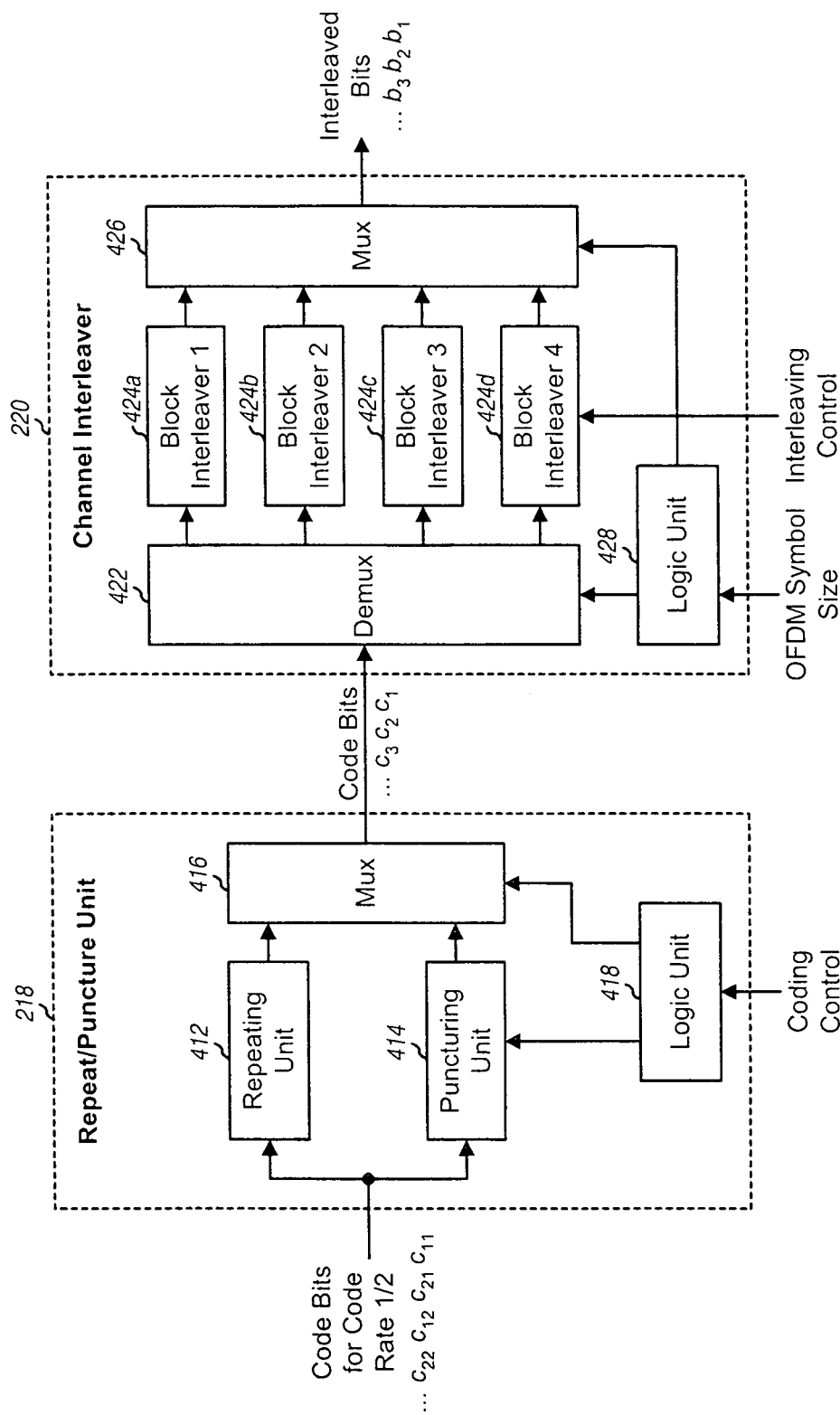
FIG. 4 shows a repeat/puncture unit and a channel interleaver.

FIG. 4 shows an embodiment of repeat/puncture unit 218, which can be used to generate various code rates based on the base code rate of 1/2. Within repeat/puncture unit 218, the rate 1/2 code bits from encoder 216 are provided to either a repeating unit 412 or a puncturing unit 414. Repeating unit 412 repeats each rate 1/2 code bit once to obtain an effective code rate of 1/4. Puncturing unit 414 deletes some of the rate 1/2 code bits based on a specific puncturing pattern to obtain the desired code rate. Table 2 lists exemplary puncturing patterns that may be used for the code rates supported by the system. Other puncturing patterns may also be used.

TABLE 2

| Code Rate | Puncturing Pattern |
|---|---|
| 1/2 | 11 |
| 7/12 | 11111110111110 |
| 5/8 | 1110111011 |
| 2/3 | 1110 |
| 3/4 | 111001 |
| 5/6 | 1110011001 |
| 7/8 | 11101010011001 |

For a k/n code rate, there are n coded bits for every k information bits. The rate 1/2 base code provides 2k rate 1/2 code bits for every k information bits. To obtain code rate of k/n, puncturing unit 218 outputs n code bits for each input group of 2k rate 1/2 code bits received from encoder 216. Thus, 2k−n code bits are deleted from each group of 2k rate 1/2 code bits to obtain the n rate k/n code bits. The code bits to be deleted from each group are denoted by zeros in the puncturing pattern. For example, to obtain a code rate of 7/12, two code bits are deleted from each group of 14 code bits from encoder 216, with the deleted bits being the 8-th and 14-th bits in the group, as denoted by the puncturing pattern "11111110111110." No puncturing is performed if the desired code rate is 1/2.

A multiplexer 416 receives the stream of code bits from repeating unit 412 and the stream of code bits from punctur-

TABLE 1

| | | | | | Short OFDM Symbol | | Long OFDM Symbol | |
|---|---|---|---|---|---|---|---|---|
| Rate Index | Spectral Efficiency (bps/Hz) | Code Rate | Modulation Scheme | Required SNR (dB) | Info Bits/ OFDM Symbol | Code Bits/ OFDM Symbol | Info Bits/ OFDM Symbol | Code Bits/ OFDM Symbol |
| 0 | 0.00 | — | — | — | 0 | 0 | 0 | 0 |
| 1 | 0.25 | 1/4 | BPSK | −1.8 | 12 | 48 | 48 | 192 |
| 2 | 0.5 | 1/2 | BPSK | 1.2 | 24 | 48 | 96 | 192 |
| 3 | 1.0 | 1/2 | QPSK | 4.2 | 48 | 96 | 192 | 384 |
| 4 | 1.5 | 3/4 | QPSK | 6.8 | 72 | 96 | 288 | 384 |
| 5 | 2.0 | 1/2 | 16 QAM | 10.1 | 96 | 192 | 384 | 768 |
| 6 | 2.5 | 5/8 | 16 QAM | 11.7 | 120 | 192 | 480 | 768 |
| 7 | 3.0 | 3/4 | 16 QAM | 13.2 | 144 | 192 | 576 | 768 |
| 8 | 3.5 | 7/12 | 64 QAM | 16.2 | 168 | 288 | 672 | 1152 |
| 9 | 4.0 | 2/3 | 64 QAM | 17.4 | 192 | 288 | 768 | 1152 |
| 10 | 4.5 | 3/4 | 64 QAM | 18.8 | 216 | 288 | 864 | 1152 |
| 11 | 5.0 | 5/6 | 64 QAM | 20.0 | 240 | 288 | 960 | 1152 |
| 12 | 6.0 | 3/4 | 256 QAM | 24.2 | 288 | 384 | 1152 | 1536 |
| 13 | 7.0 | 7/8 | 256 QAM | 26.3 | 336 | 384 | 1344 | 1536 |

In Table 1, BPSK denotes binary phase shift keying,
QPSK denotes quadrature phase shift keying, and
QAM denotes quadrature amplitude modulation.

ing unit 414. Multiplexer 416 provides the code bits from repeating unit 412 if the desired code rate is 1/4 and the code bits from puncturing unit 414 if the desired code rate is 1/2 or higher. A logic unit 418 receives the coding control and generates a puncturing control for puncturing unit 414 and a multiplexer control for multiplexer 416.

Other coding schemes and puncturing patterns besides those described above may also be used, and this is within the scope of the invention. For example, a Turbo code, a low density parity check (LDPC) code, a block code, some other codes, or any combination thereof may be used to encode data. Also, different coding schemes may be used for different transport channels. For example, a convolutional code may be used for transport channels carrying system information and control data, and a Turbo code may be used for transport channels carrying traffic data.

With the coding and puncturing schemes described above, multiple code rates can be supported with the same encoder at the access point and the same decoder at the user terminal. This can greatly simplify the designs of the access point and the user terminal.

System 100 utilizes two OFDM symbol sizes to achieve greater efficiency. In an exemplary design, a "short" OFDM symbol is composed of 64 subbands, and a "long" OFDM symbol is composed of 256 subbands. For the short OFDM symbol, the 64 subbands are assigned indices of −32 to +31, 48 subbands (e.g., with indices of $K_S=\pm\{1, \ldots, 6, 8, \ldots, 20, 22, \ldots, 26\}$) are used for data transmission and are referred to as data subbands, 4 subbands (e.g., with indices of $\pm\{7, 21\}$) are used for pilot transmission, the DC subband (with index of 0) is not used, and the remaining subbands are also not used and serve as guard subbands. For the long OFDM symbol, the 256 subbands are assigned indices of −128 to +127, 192 subbands (e.g., with indices of $K_L=\pm\{1, \ldots, 24, 29, \ldots, 80, 85, \ldots, 104\}$) are used for data transmission, 16 subbands (e.g., with indices of $\pm\{25, \ldots, 28, 81, \ldots, 84\}$) are used for pilot transmission, the DC subband is not used, and the remaining subbands are also not used and serve as guard subbands.

The pilot and data subbands for the long OFDM symbol may be mapped to the pilot and data subbands for the short OFDM symbol based on the following:

$$k_l = 4 \cdot k_s - sgn(k_s) \cdot k_{os}, \quad (1)$$

where $k_s$ is an index for the subbands of the short OFDM symbol ($k_s \in K_S$);
$k_{os}$ is a subband index offset ($k_{os} \in \{0,1,2,3\}$);
$sgn(k_s)$ provides the sign of $k_s$ (i.e., "+" or "−"); and
$k_l$ is an index for the subbands of the long OFDM symbol ($k_l \in K_L$).

Each data/pilot subband of the short OFDM symbol is associated with four data/pilot subbands of the long OFDM symbol, which are associated with four values for the subband index offset $k_{os}$.

Table 1 also lists the number of data bits that may be sent in each short and long OFDM symbol for each non-zero rate. A data packet may be sent using any number of long OFDM symbols and a small number of short OFDM symbols. For example, a data packet may be sent using $N_L$ long OFDM symbols and $N_S$ short OFDM symbols, where $N_L \geq 0$ and $3 \geq N_S > 0$. The $N_S$ short OFDM symbols at the end of the $N_L$ long OFDM symbols reduce the amount of unused capacity. OFDM symbols of different sizes may thus be used to better match the data-carrying capacity of the OFDM symbols to the packet payload to maximize packing efficiency.

In an embodiment, the same interleaving scheme is used for both the short and long OFDM symbols. The code bits to be transmitted in each short OFDM symbol are interleaved across all 48 data subbands. The code bits to be transmitted in each long OFDM symbol are partitioned into four blocks, and the code bits in each block are interleaved across a respective group of 48 data subbands. For both cases, the interleaving is performed over one OFDM symbol period.

FIG. 4 also shows an embodiment of interleaver 220, which can be used for both the short and long OFDM symbols. Within interleaver 220, a demultiplexer 422 receives a sequence of code bits for each OFDM symbol from repeat/puncture unit 218. The code bit sequence is denoted as $\{c_i\}$, where $i \in \{0, \ldots, 48 \cdot B-1\}$ for the short OFDM symbol, $i \in \{0, \ldots, 192 \cdot B-1\}$ for the long OFDM symbol, and B is the number of code bits for each modulation symbol.

For a short OFDM symbol, multiplexer 422 provides all $48 \cdot B$ code bits in the sequence to a block interleaver 424a. Interleaver 424a then interleaves (i.e., reorders) the code bits across the 48 data subbands of the short OFDM symbol in accordance with the frequency interleaving scheme shown in Table 3. For this interleaving scheme, each code bit in the sequence $\{c_i\}$ is assigned a bit index of i modulo-48. The code bits in the sequence are effectively partitioned into B groups, with each group containing 48 code bits that are assigned bit indices of 0 through 47. Each bit index is associated with a respective data subband. All code bits with the same bit index are transmitted on the data subband associated with that bit index. For example, the first code bit (with bit index of 0) in each group is transmitted on subband −26, the second code bit (with bit index of 1) is transmitted on subband 1, the third code bit (with bit index of 2) is transmitted on subband −17, and so on. After the entire sequence of code bits has been interleaved, block interleaver 424a provides the interleaved bits to a multiplexer 426. For the short OFDM symbol, block interleavers 424b, 424c, and 424d are not used, and multiplexer 426 provides the interleaved bits from only block interleaver 424a.

TABLE 3

| Subband Index $k_s$ | Bit Index |
|---|---|
| — | — |
| −26 | 0 |
| −25 | 6 |
| −24 | 12 |
| −23 | 18 |
| −22 | 24 |
| −21 | — |
| −20 | 30 |
| −19 | 36 |
| −18 | 42 |
| −17 | 2 |
| −16 | 8 |
| −15 | 14 |
| −14 | 20 |
| −13 | 26 |
| −12 | 32 |
| −11 | 38 |
| −10 | 44 |
| −9 | 4 |
| −8 | 10 |
| −7 | — |
| −6 | 16 |
| −5 | 22 |
| −4 | 28 |
| −3 | 34 |
| −2 | 40 |
| −1 | 46 |
| 0 | — |
| 1 | 1 |
| 2 | 7 |
| 3 | 13 |

TABLE 3-continued

| Subband Index $k_s$ | Bit Index |
|---|---|
| 4 | 19 |
| 5 | 25 |
| 6 | 31 |
| 7 | — |
| 8 | 37 |
| 9 | 43 |
| 10 | 3 |
| 11 | 9 |
| 12 | 15 |
| 13 | 21 |
| 14 | 27 |
| 15 | 33 |
| 16 | 39 |
| 17 | 45 |
| 18 | 5 |
| 19 | 11 |
| 20 | 17 |
| 21 | — |
| 22 | 23 |
| 23 | 29 |
| 24 | 35 |
| 25 | 41 |
| 26 | 47 |
| — | — |

For a long OFDM symbol, demultiplexer 422 provides the first block of 48·B code bits in the sequence to block interleaver 424a, the next block of 48·B code bits to block interleaver 424b, the third block of 48·B code bits to block interleaver 424c, and the last block of 48·B code bits to block interleaver 424d. The four blocks of code bits in interleavers 424a through 424d are assigned subband index offsets of $k_{os}$=0, 1, 2, and 3, respectively. Each block interleaver 424 interleaves its code bits across 48 data subbands in the manner described above for the short OFDM symbol. After the entire sequence of code bits have been interleaved, multiplexer 426 receives the interleaved bits from block interleavers 424a through 424d and maps these bits in the proper order to the corresponding subbands of the long OFDM symbol. In particular, the short OFDM symbol subband index $k_s$ and the subband index offset $k_{os}$ for each block interleaver 424 are used to generate the corresponding long OFDM symbol subband index $k_l$, as shown in equation (1). A logic unit 428 receives the OFDM symbol size from controller 130 and generates the controls for demultiplexer 422 and multiplexer 426.

FIG. 4 shows an exemplary design for channel interleaver 220. Other designs that can support both the short and long OFDM symbols may also be used. For example, one interleaver may be used to store all of the code bits to be interleaved. Multiplexer 426 or demultiplexer 422 would then map the code bits from this interleaver to the proper subbands.

The frequency interleaving scheme shown in Table 3 assigns code bits with even indices (after the puncturing) to subbands with negative indices and code bits with odd indices to subbands with positive indices. For code rate 1/2, the code bits from the first generator 133 are transmitted on subbands with negative indices and the code bits from the second generator 171 are transmitted on subbands with positive indices. The code bits may also be shuffled such that the code bits from each generator are spread across all data subbands.

The interleaving may be performed in various other manners. For example, after the interleaving across the data subbands, the code bits for each subband may further be interleaved over multiple OFDM symbol periods to achieve time diversity.

For both the short and long OFDM symbols, interleaver 220 provides a sequence of interleaved code bits for each OFDM symbol. The sequence contains B interleaved code bits for each data subband. Symbol mapping unit 222 then maps the interleaved code bits to data symbols based on a modulation scheme determined by the selected rate, as shown in Table 1.

Table 4 shows the symbol mapping for six modulation schemes supported by the system. For each modulation scheme (except for BPSK), B/2 code bits are mapped to an inphase (I) component and the other B/2 code bits are mapped to a quadrature (Q) component. In an embodiment, the signal constellation for each modulation scheme is defined based on Gray mapping. With Gray mapping, neighboring points in the signal constellation (in both the I and Q components) differ by only one bit position. Gray mapping reduces the number of bit errors for the more likely error events, which correspond to a received symbol being mapped to a location near the correct location, in which case only one code bit would be detected in error.

TABLE 4

| BPSK | | | |
|---|---|---|---|
| $b_0$ | I | | Q |
| 0 | −1 | | 0 |
| 1 | 1 | | 0 |

| QPSK | | | |
|---|---|---|---|
| $b_0$ | I | $b_1$ | Q |
| 0 | −1 | 0 | −1 |
| 1 | 1 | 1 | 1 |

| 16 QAM | | | |
|---|---|---|---|
| $b_0b_1$ | I | $b_2b_3$ | Q |
| 00 | −3 | 00 | −3 |
| 01 | −1 | 01 | −1 |
| 11 | 1 | 11 | 1 |
| 10 | 3 | 10 | 3 |

| 64 QAM | | | |
|---|---|---|---|
| $b_0b_1b_2$ | I | $b_3b_4b_5$ | Q |
| 000 | −7 | 000 | −7 |
| 001 | −5 | 001 | −5 |
| 011 | −3 | 011 | −3 |
| 010 | −1 | 010 | −1 |
| 110 | 1 | 110 | 1 |
| 111 | 3 | 111 | 3 |
| 101 | 5 | 101 | 5 |
| 100 | 7 | 100 | 7 |

| 256 QAM | | | |
|---|---|---|---|
| $b_0b_1b_2b_3$ | I | $b_4b_5b_6b_7$ | Q |
| 0000 | −15 | 0000 | −15 |
| 0001 | −13 | 0001 | −13 |
| 0011 | −11 | 0011 | −11 |
| 0010 | −9 | 0010 | −9 |
| 0110 | −7 | 0110 | −7 |
| 0111 | −5 | 0111 | −5 |
| 0101 | −3 | 0101 | −3 |
| 0100 | −1 | 0100 | −1 |
| 1100 | 1 | 1100 | 1 |
| 1101 | 3 | 1101 | 3 |
| 1111 | 5 | 1111 | 5 |
| 1110 | 7 | 1110 | 7 |
| 1010 | 9 | 1010 | 9 |
| 1011 | 11 | 1011 | 11 |

TABLE 4-continued

| 1001 | 13 | 1001 | 13 |
|------|----|------|----|
| 1000 | 15 | 1000 | 15 |

Normalization Factor $K_{mod}$

| Modulation Scheme | Value |
|-------------------|-------|
| BPSK | 1.0 |
| QPSK | $1/\sqrt{2}$ |
| 16 QAM | $1/\sqrt{10}$ |
| 64 QAM | $1/\sqrt{42}$ |
| 256 QAM | $1/\sqrt{170}$ |

For each of the four QAM modulation schemes shown in Table 4, the left-most bit for each component is least likely to be received in error and the right-most bit for each component is most likely to be received in error. To achieve equal likelihood of error for each bit position, the B bits that make up each QAM symbol may be shuffled. This would in effect implement interleaving across the dimensions of the QAM symbols such that the code bits forming the QAM symbols are mapped to different bit positions of the QAM symbols.

The I and Q values for each modulation scheme shown in Table 4 are scaled by a normalization factor $K_{mod}$ so that the average power of all signal points in the associated signal constellation is equal to unity. The normalization factor for each modulation scheme is shown in Table 4. Quantized values for the normalization factors may also be used. The data symbol s(k) for each data subband would then have the following form:

$$s(k)=(I+jQ)\cdot K_{mod}, \quad \text{Eq (2)}$$

where $k \in K_S$ for the short OFDM symbol and $k \in K_L$ for the long OFDM symbol;

I and Q are the values in Table 4 for the selected modulation scheme; and $K_{mod}$ is dependent on the selected modulation scheme.

System 100 performs spatial processing to achieve transmit diversity across two dimensions. In an embodiment, system 100 implements (1) space-time transmit diversity (STTD) on a per-subband and per-OFDM-symbol-pair basis to achieve space and time diversity for the short OFDM symbol and (2) space-frequency transmit diversity (SFTD) on a per-subband-pair and per-OFDM-symbol basis to achieve space and frequency diversity for the long OFDM symbol.

An exemplary STTD scheme for the short OFDM symbol operates as follows. Suppose that two data symbols, denoted as $s_1$ and $s_2$, are to be transmitted on a given subband. The access point generates two vectors, $x_1=[s_1 \ s_2]^T$ and $x_2=[s_2^* -s_1^*]^T$, where "*" denotes the complex conjugate and "T" denotes the transpose. Each vector includes two transmit symbols that are to be transmitted from two antennas in one OFDM symbol period (e.g., vector $x_1$ is transmitted from two antennas in the first OFDM symbol period, and vector $x_2$ is transmitted from two antennas in the next OFDM symbol period). Each data symbol is thus transmitted over two OFDM symbol periods (e.g., transmit symbol $s_1$ is transmitted from one antenna in the first symbol OFDM period, and transmit symbol $-s_1^*$ is transmitted from another antenna in the next OFDM symbol period).

If the user terminal is equipped with a single antenna, then the received symbols may be expressed as:

$$r_1=h_1s_1+h_2s_2+n_1, \text{and}$$

$$r_2=h_1s_2^*-h_2s_1^*+n_2, \quad \text{Eq (3)}$$

where $r_1$ and $r_2$ are two received symbols for two consecutive OFDM symbol periods;

$h_1$ and $h_2$ are the path gains from the two transmit antennas to the receive antenna for the subband under consideration; and $n_1$ and $n_2$ are the noise for the two received symbols $r_1$ and $r_2$, respectively.

The user terminal may derive estimates of the two data symbols, $s_1$ and $s_2$, as follows:

$$\hat{s}_1 = \frac{h_1^* r_1 - h_2 r_2^*}{|h_1|^2 + |h_2|^2} = s_1 + \frac{h_1^* n_1 - h_2 n_2^*}{|h_1|^2 + |h_2|^2}, \text{ and} \quad \text{Eq (4)}$$

$$\hat{s}_2 = \frac{h_2^* r_1 + h_1 r_2^*}{|h_1|^2 + |h_2|^2} = s_2 + \frac{h_2^* n_1 + h_1 n_2^*}{|h_1|^2 + |h_2|^2}.$$

Alternatively, the access point may generate two vectors as $x_1=[s_1 -s_2^*]^T$ and $x_2=[s_2 s_1^*]^T$ and transmit these two vectors sequentially in two OFDM symbol periods. The user terminal may derive estimates of the two data symbols as $\hat{s}_1=(h_1^* r_1 + h_2 r_2^*)/\alpha$ and $\hat{s}_2=(-h_2 r_1^* r_2)/\alpha$, where $\alpha=|h_1|^2+|h_2|^2$.

The above description may be extended for a system with two or more transmit antennas, multiple receive antennas, and multiple subbands. Two transmit antennas are used for each data subband. Suppose that two data symbols, denoted as $s_1(k)$ and $s_2(k)$, are to be transmitted on a given subband k. The access point generates two vectors $x_1(k)=[s_1(k) \ s_2(k)]^T$ and $x_2(k)=[s_2^*(k) -s_1^*(k)]^T$ or equivalently two symbol sets $\{x_1(k)\}=\{s_1(k) \ s_2^*(k)\}$ and $\{x_2(k)\}=\{s_2(k) -s_1^*(k)\}$. Each symbol set includes two transmit symbols that are to be transmitted sequentially in two OFDM symbol periods from a respective antenna on subband k (i.e., symbol set $\{x_i(k)\}$ is transmitted on subband k from antenna i in two OFDM symbol periods, and symbol set $\{x_j(k)\}$ is transmitted on subband k from antenna j in the same two OFDM symbol periods).

If the user terminal is equipped with multiple antennas, then the received symbols may be expressed as:

$$r_1(k)=h_i(k)s_1(k)+h_j(k)s_2(k)+n_1(k), \text{ and}$$

$$r_2(k)=h_i(k)s_2^*(k)-h_j(k)s_1^*(k)+n_2(k) \quad \text{Eq(5)}$$

where $r_1(k)$ and $r_2(k)$ are two symbol vectors received in two consecutive OFDM symbol periods on subband k at the user terminal, with each vector including $N_R$ received symbols for $N_R$ receive antennas;

$h_i(k)$ and $h_j(k)$ are the vectors of path gains for transmit antennas i and j, respectively, for subband k, with each vector including the channel gains from the associated transmit antenna to each of the $N_R$ receive antennas; and $n_1(k)$ and $n_2(k)$ are the noise vectors for the two received symbol vectors $r_1(k)$ and $r_2(k)$, respectively.

The user terminal may derive estimates of the two data symbols, $s_1(k)$ and $s_2(k)$, as follows:

$$\hat{s}_1(k) = \frac{\hat{\underline{h}}_i^H(k)\underline{r}_1(k) - \underline{r}_2^H(k)\hat{\underline{h}}_j(k)}{\left\|\hat{\underline{h}}_i(k)\right\|^2 + \left\|\hat{\underline{h}}_j(k)\right\|^2} \quad \text{Eq (6)}$$

$$= s_1(k) + \frac{\hat{\underline{h}}_i^H(k)\underline{n}_1(k) - \underline{n}_2^H(k)\hat{\underline{h}}_j(k)}{\left\|\hat{\underline{h}}_i(k)\right\|^2 + \left\|\hat{\underline{h}}_j(k)\right\|^2}, \text{ and}$$

-continued $$\hat{s}_2(k) = \frac{\hat{h}_j^H(k)\underline{r}_1(k) - \underline{r}_2^H(k)\hat{h}_i(k)}{\|\hat{h}_i(k)\|^2 + \|\hat{h}_j(k)\|^2}$$

$$= s_2(k) + \frac{\hat{h}_j^H(k)\underline{n}_1(k) - \underline{n}_2^H(k)\hat{h}_i(k)}{\|\hat{h}_i(k)\|^2 + \|\hat{h}_j(k)\|^2}.$$

Alternatively, the access point may generate two symbol sets $x_i(k)=\{s_1(k)\ s_2(k)\}$ and $x_j(k)=\{-s_2^*(k)\ s_1^*(k)\}$ and transmit these symbol sets from antennas i and j. The user terminal may derive estimates of the two data symbols as $\hat{s}_1(k)=[\hat{h}_i^H(k)r_1(k)+r_2^H(k)\hat{h}_j(k)]/\beta$ and $\hat{s}_2(k)=[\hat{h}_j^H(k)r_2(k)-r_1^H(k)\hat{h}_j(k)]/\beta$, where $\beta=\|\hat{h}_i(k)\|^2+\|\hat{h}_j(k)\|^2$.

The STTD scheme utilizes one pair of transmit antennas for each data subband. If the access point is equipped with two transmit antennas, then both antennas are used for all 48 data subbands of the short OFDM symbol. If the access point is equipped with four transmit antennas, then each antenna is used for half of the 48 data subbands. Table 5 lists an exemplary subband-antenna assignment scheme for the STTD scheme for the short OFDM symbol.

TABLE 5

| Subband Index $k_s$ | Transmit Antennas |
|---|---|
| — | — |
| −26 | 1, 2 |
| −25 | 3, 4 |
| −24 | 1, 3 |
| −23 | 2, 4 |
| −22 | 1, 4 |
| −21 | — |
| −20 | 2, 3 |
| −19 | 1, 2 |
| −18 | 3, 4 |
| −17 | 1, 3 |
| −16 | 2, 4 |
| −15 | 1, 4 |
| −14 | 2, 3 |
| −13 | 1, 2 |
| −12 | 3, 4 |
| −11 | 1, 3 |
| −10 | 2, 4 |
| −9 | 1, 4 |
| −8 | 2, 3 |
| −7 | — |
| −6 | 1, 2 |
| −5 | 3, 4 |
| −4 | 1, 3 |
| −3 | 2, 4 |
| −2 | 1, 4 |
| −1 | 2, 3 |
| 0 | — |
| 1 | 3, 4 |
| 2 | 1, 2 |
| 3 | 2, 4 |
| 4 | 1, 3 |
| 5 | 2, 3 |
| 6 | 1, 4 |
| 7 | — |
| 8 | 3, 4 |
| 9 | 1, 2 |
| 10 | 2, 4 |
| 11 | 1, 3 |
| 12 | 2, 3 |
| 13 | 1, 4 |
| 14 | 3, 4 |
| 15 | 1, 2 |
| 16 | 2, 4 |
| 17 | 1, 3 |
| 18 | 2, 3 |
| 19 | 1, 4 |
| 20 | 3, 4 |
| 21 | — |
| 22 | 1, 2 |
| 23 | 2, 4 |
| 24 | 1, 3 |
| 25 | 2, 3 |
| 26 | 1, 4 |
| — | — |
| — | — |

Figure 5:
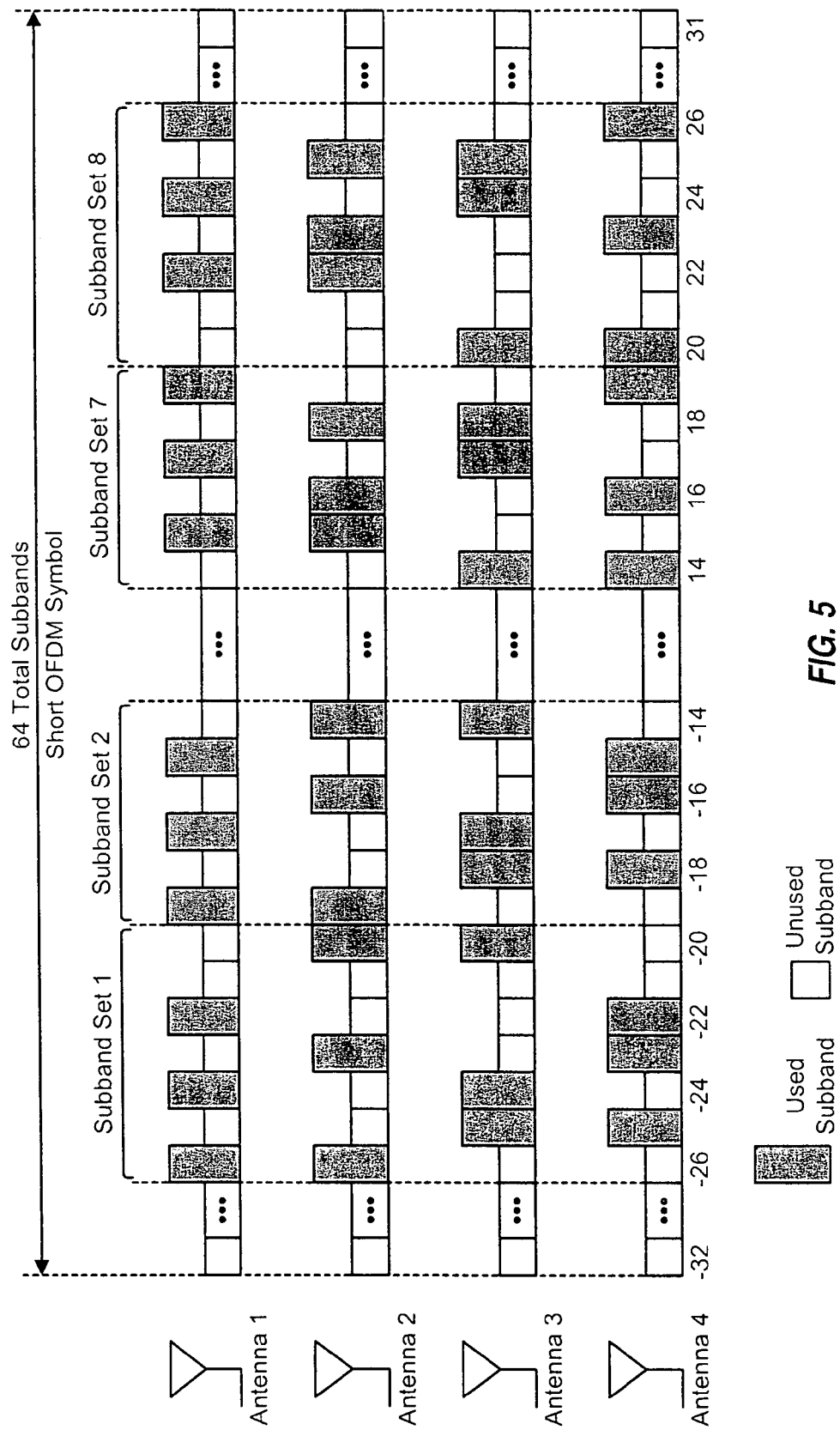
FIG. 5 shows a subband-antenna assignment scheme.

FIG. 5 illustrates the subband-antenna assignment scheme shown in Table 5. For this scheme, transmit antennas 1 and 2 are used for subbands with indices {−26, −19, −13, −6, 2, 9, 15, 22}, transmit antennas 3 and 4 are used for subbands with indices {−25, −18, −12, −5, 1, 8, 14, 20}, and so on. There are six different antenna pairings with four transmit antennas. Each of the six antenna pairings is used for 8 data subbands, which are spaced approximately uniformly across the 48 data subbands. The antenna pairing to subband assignment is such that different antennas are used for adjacent subbands, which may provide greater frequency and spatial diversity. For example, antennas 1 and 2 are used for subband −26, and antennas 3 and 4 are used for subband −25.

The antenna-subband assignment in Table 5 is also such that all four transmit antennas are used for each code bit for the lowest code rate of 1/4, which maximizes spatial diversity. For code rate 1/4, each code bit is repeated and sent on two subbands that are mapped to two disjoint antenna pairs so that all four antennas are used to transmit that code bit. For example, bit indices 0 and 1 in Table 3 correspond to the same repeated code bit, the code bit with index 0 is transmitted from antennas 1 and 2 on subband −26, and the code bit with index 1 is transmitted from antennas 3 and 4 on subband 1.

The long OFDM symbol is approximately four times the duration of the short OFDM symbol. To minimize processing delay and buffering requirements, space-frequency transmit diversity is used to transmit two long OFDM symbols concurrently on two subbands from two antennas.

An exemplary SFTD scheme for the long OFDM symbol operates as follows. Suppose that two data symbols, denoted as $s(k_1)$ and $s(k_1+1)$, are generated and mapped to two adjacent subbands of a long OFDM symbol. The access point transmits symbols $s(k_1)$ and $s(k_1+1)$ from two antennas on subband $k_1$ and transmits symbols $s^*(k_1+1)$ and $-s^*(k_1)$ from the same two antennas on subband $k_1+1$. Adjacent subbands are used for the pair of data symbols because the channel response is assumed to be approximately constant over the two subbands.

If the access point is equipped with two transmit antennas, then both antennas are used for all 192 data subbands of the long OFDM symbol. If the access point is equipped with four transmit antennas, then the same subband-antenna assignment scheme shown in Table 5 may also be used for the long OFDM symbol. In this case, a subband of index $k_l$ for the long OFDM symbol is first mapped to a corresponding subband of index $k_s$ for the short OFDM symbol, as follows:

$$k_s = \left\lfloor \frac{k_l + sgn(k_l) + k_{os}}{4} \right\rfloor, \qquad \text{Eq (7)}$$

where $\lfloor z \rfloor$ is a floor operator that provides the nearest lower integer for z, and $k_{os}$ is the subband index offset for long OFDM subband index $k_l$ ($k_{os} \in \{0, 1, 2, 3\}$).

The antenna pair corresponding to the mapped short OFDM symbol subband index $k_s$ is determined from Table 5 and used for the long OFDM symbol subband with index $k_l$.

For the SFTD scheme, the processing at the user terminal to obtain estimates of the two data symbols can be performed as shown in equations (4) and (6). However, the computation is performed on received symbols obtained on two subbands instead of two OFDM symbol periods.

Figure 6:
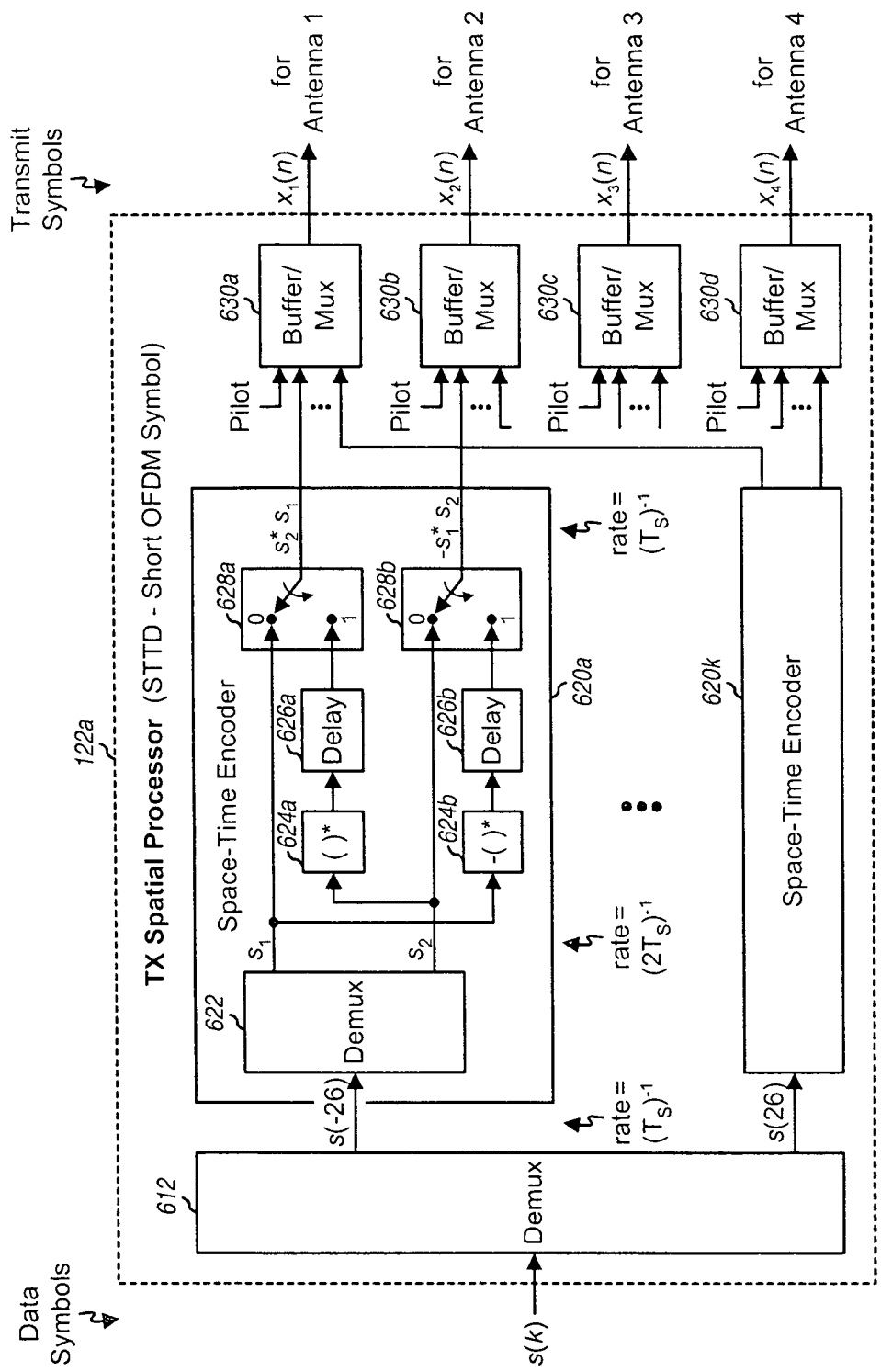
FIG. 6 shows a transmit (TX) spatial processor for the STTD scheme.

FIG. 6 shows a block diagram of a TX spatial processor 122a, which implements the STTD scheme for the short OFDM symbol. TX spatial processor 122a is one embodiment of TX spatial processor 122 in FIG. 1.

Within TX spatial processor 122a, a demultiplexer 612 receives a stream of data symbols, $\{s(k)\}$, from TX data processor 120, demultiplexes the stream into 48 data symbol substreams for the 48 data subbands of the short OFDM symbol, and provides each substream to a respective space-time encoder 620. Each substream includes one data symbol for each short OFDM symbol period, which corresponds to a symbol rate of $T_S^{-1}$, where $T_S$ is the duration of one short OFDM symbol.

Within each space-time encoder 620, a demultiplexer 622 demultiplexes the data symbol substream into two symbol sequences, with each sequence having a symbol rate of $(2T_S)^{-1}$. The first symbol sequence is provided to a "0" input of a switch 628a and a unit 624b, which inverts and conjugates each symbol in the sequence. The second symbol sequence is provided to a "0" input of a switch 628b and a unit 624a, which conjugates each symbol in the sequence. A delay unit 626a delays the symbols from unit 624a by one short OFDM symbol period and provides the delayed symbols to a "1" input of switch 628a. A delay unit 626b delays the symbols from unit 624b by one short OFDM symbol period and provides the delayed symbols to a "1" input of switch 628b. Switch 628a toggles at the short OFDM symbol rate and provides symbol set $\{x_i(k)\}=\{s_1(k)\ s_2^*(k)\}$ for one transmit antenna for each two OFDM symbol periods. Similarly, switch 628b toggles at the short OFDM symbol rate and provides symbol set $\{x_j(k)\}=\{s_2(k)\ -s_1^*(k)\}$ for another transmit antenna for each two OFDM symbol periods.

Buffers/multiplexers 630a through 630d buffer and multiplex the transmit symbols from space-time encoders 620. Each buffer/multiplexer 630 receives pilot symbols and transmit symbols from the appropriate space-time encoders 620, as determined by Table 5. In particular, buffer/multiplexer 630a receives transmit symbols for all subbands mapped to antenna 1 (e.g., subbands −26, −24, −22, −19, and so on), buffer/multiplexer 630b receives transmit symbols for all subbands mapped to antenna 2 (e.g., subbands −26, −23, −20, −19, and so on), buffer/multiplexer 630c receives transmit symbols for all subbands mapped to antenna 3 (e.g., subbands −25, −24, −20, −18, and so on), and buffer/multiplexer 630d receives transmit symbols for all subbands mapped to antenna 4 (e.g., subbands −25, −23, −22, −18, and so on).

Each buffer/multiplexer 630 then, for each short OFDM symbol period, multiplexes four pilot symbols for the four pilot subbands, 24 transmit symbols for 24 data subbands, and 36 signal values of zero (or "zero" symbols) for 36 unused subbands to form a sequence of 64 transmit symbols for the 64 total subbands. Although there are 48 data subbands for the short OFDM symbol, only 24 subbands are used for each transmit antenna for the STTD scheme because only two antennas are used for each subband, and the effective number of unused subbands for each antenna is thus 36 instead of 12. Each transmit symbol in the sequence may be a transmit symbol from encoder 620, a pilot symbol, or a zero symbol and is sent on one subband in one short OFDM symbol period. Each buffer/multiplexer 630 provides a stream of transmit symbols $\{x_i(k)\}$ for one transmit antenna. Each transmit symbol stream contains concatenated sequences of 64 transmit symbols, one sequence for each OFDM symbol period.

Figure 7:
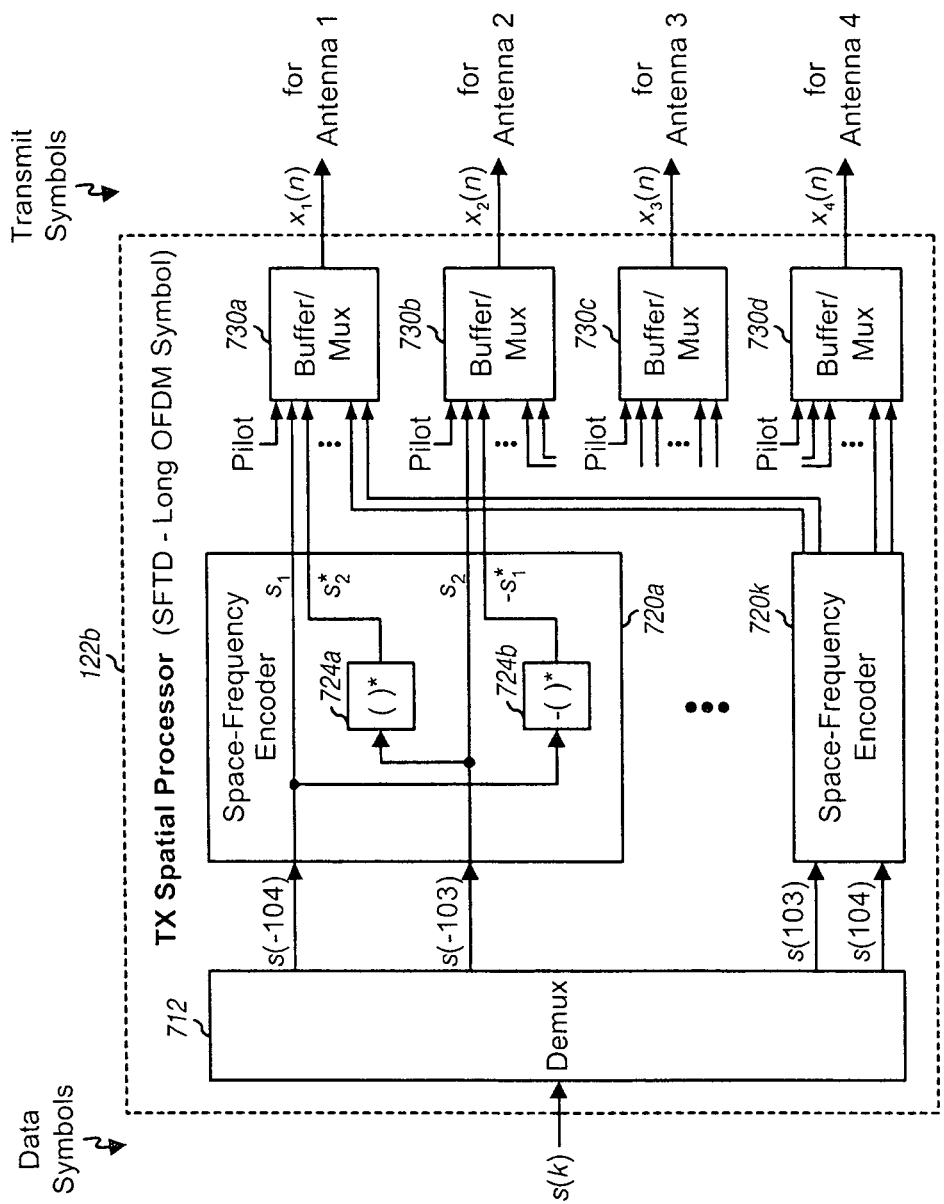
FIG. 7 shows a TX spatial processor for the SFTD scheme.

FIG. 7 shows a block diagram of a TX spatial processor 122b, which implements the SFTD scheme for the long OFDM symbol. TX spatial processor 122b is another embodiment of TX spatial processor 122 in FIG. 1.

Within TX spatial processor 122b, a demultiplexer 712 receives a stream of data symbols, $\{s(k)\}$, from TX data processor 120, demultiplexes the stream into 192 data symbol substreams for the 192 data subbands of the long OFDM symbol, and provides each pair of substreams to a respective space-frequency encoder 720. Each substream includes one data symbol for each long OFDM symbol period, which corresponds to a symbol rate of $T_L^{-1}$, where $T_L$ is the duration of one long OFDM symbol.

Each space-frequency encoder 720 receives a pair of data symbol substreams for two subbands $k_l$ and $k_l+1$. Within each encoder 720, a unit 724a conjugates each symbol in the substream for subband $k_l+1$, and a unit 724b inverts and conjugates each symbol in the substream for subband $k_l$. Each encoder 720 provides (1) the two data symbol substreams to two buffers/multiplexers 730 for two associated antennas for transmission on subband $k_l$ and (2) the two substreams from units 724a and 724b to the same two antennas for transmission on subband $k_l+1$. The symbol rate for all substreams into and out of each space-frequency encoder 720 is $T_L^{-1}$.

Each buffer/multiplexer 730 receives pilot symbols and transmit symbols from the appropriate space-frequency encoders 720, as determined by equation (7) and Table 5. In particular, buffers/multiplexers 730a, 730b, 730c, and 730d receive transmit symbols for all subbands mapped to antennas 1, 2, 3, and 4, respectively. Each buffer/multiplexer 730 then, for each long OFDM symbol period, multiplexes 16 pilot symbols for the 16 pilot subbands, 192 transmit symbols for 192 data subbands, and 48 zero symbols for 48 unused subbands to form a sequence of 256 transmit symbols for the 256 total subbands. For the SFTD scheme, all 192 data subbands are used for data transmission. Each buffer/multiplexer 730 provides a stream of transmit symbols $\{x_i(k)\}$ for one transmit antenna.

Figure 8:
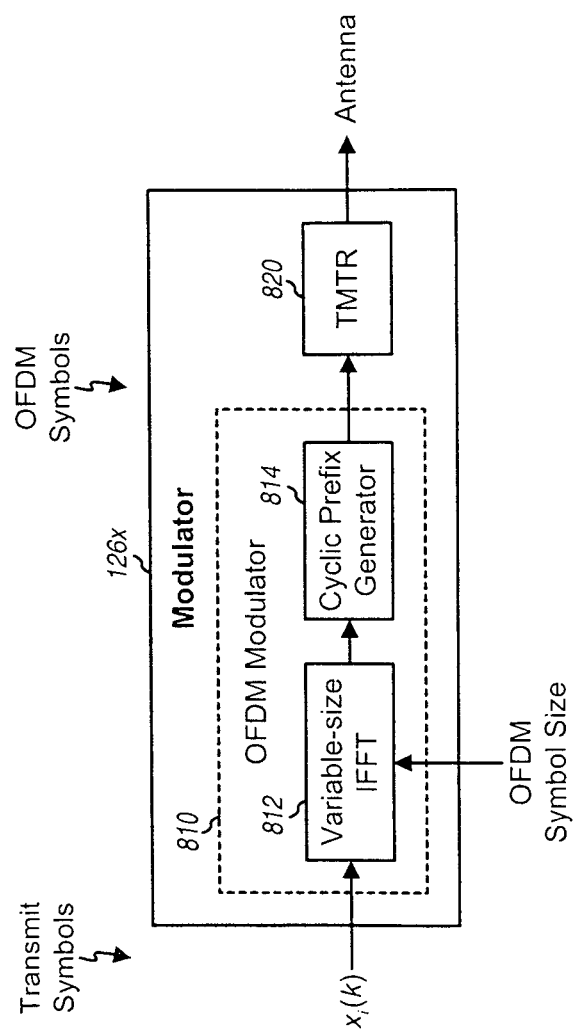
FIG. 8 shows a modulator.

FIG. 8 shows a block diagram of an embodiment of a modulator 126x, which may be used for each of modulators 126a through 126d in FIG. 1. Modulator 126x includes an OFDM modulator 810 coupled to a transmitter unit (TMTR) 820. OFDM modulator 810 includes a variable-size inverse fast Fourier transform (IFFT) unit 812 and a cyclic prefix generator 814. IFFT unit 812 receives a stream of transmit symbols, $\{x_i(k)\}$, performs an L-point IFFT on each sequence of L transmit symbols in the stream $\{x_i(k)\}$, and provides a corresponding sequence of L time-domain chips for a transformed symbol. The OFDM symbol size L is indicated by a control signal provided by controller 130 and is L=64 for the short OFDM symbol and L=256 for the long OFDM symbol. Cyclic prefix generator 814 repeats a portion of each transformed symbol from IFFT unit 812 to form a corresponding OFDM symbol. An OFDM symbol period corresponds to the duration of one OFDM symbol. The output of cyclic prefix generator 814 is a stream of OFDM symbols having sizes determined by the control signal. Transmitter unit 820 converts the stream of OFDM symbols into one or more analog signals, and further conditions (e.g., amplifies, filters, and frequency upconverts) the analog signals to generate a downlink signal suitable for transmission from an associated antenna 128x.

Figure 9:
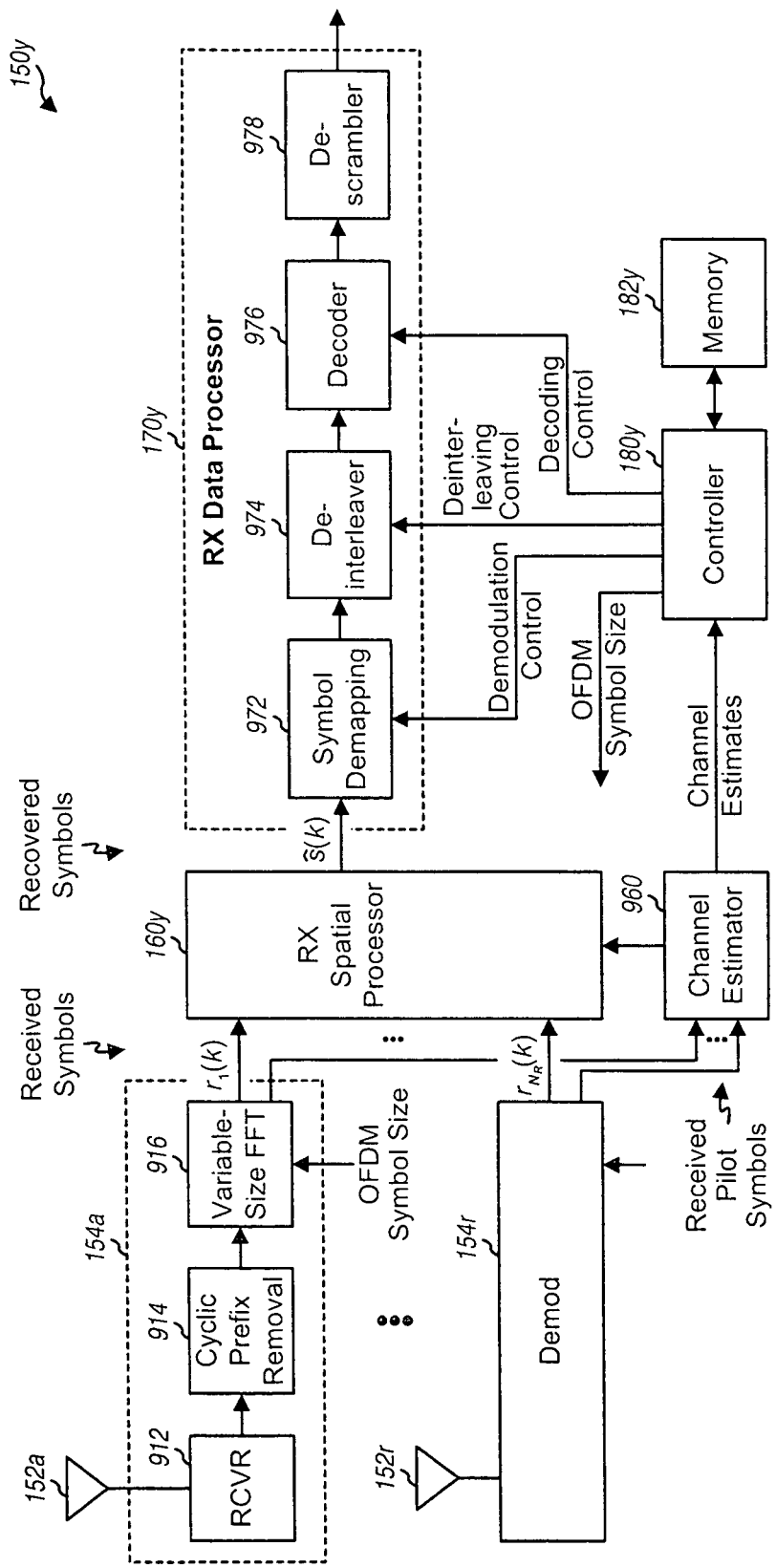
FIG. 9 shows a user terminal with multiple antennas.

FIG. 9 shows a block diagram of user terminal 150y with multiple ($N_R > 1$) antennas. The downlink signals from access point 110 are received by each of antennas 152a through 152r. Each antenna provides a received signal to a respective demodulator 154.

Within each demodulator 154, a receiver unit (RCVR) 912 conditions (e.g., frequency downconverts, amplifies, and filters) and digitizes its received signal and provides a stream of samples to an OFDM demodulator. The OFDM demodulator includes a cyclic prefix removal unit 914 and a variable-size fast Fourier transform (FFT) unit 916. Unit 914 removes the cyclic prefix in each OFDM symbol and provides a corresponding received transformed symbol that contains L samples, where L is dependent on the OFDM symbol size. Variable-size FFT unit 916 receives the stream of samples from unit 914, performs an L-point FFT on each sequence of L samples in the stream for a received transformed symbol, and provides a corresponding sequence of L received symbols for the transformed symbol. Demodulators 154a through 154r provide $N_R$ streams of received symbols (for data) to RX spatial processor 160y and received pilot symbols to a channel estimator 960.

RX spatial processor 160y performs spatial processing on the $N_R$ streams of received symbols with channel gain estimates from channel estimator 960, e.g., as shown in equation (6). RX spatial processor 160y provides to RX data processor 170y a stream of recovered data symbols, $\{\hat{s}(k)\}$, which is an estimate of the stream of data symbols, $\{s(k)\}$, transmitted by access point 110.

Within RX data processor 170y, a symbol demapping unit 972 demodulates the recovered data symbols in accordance with the modulation scheme used for the data stream, as indicated by a demodulation control provided by controller 180y. A channel deinterleaver 974 then deinterleaves the demodulated data in a manner complementary to the interleaving performed at access point 110, as indicated by a deinterleaving control provided by controller 180y. For the short OFDM symbol, the deinterleaving is performed across 48 data subbands for each short OFDM symbol, complementary to the interleaving described above. For the long OFDM symbol, the deinterleaving is performed across each of the four blocks of 48 data subbands, as also described above. A decoder 976 then decodes the deinterleaved data in a manner complementary to the encoding performed at access point 110, as indicated by a decoding control provided by controller 180y. A Viterbi decoder may be used for decoder 976 for the convolutional coding scheme described above. A descrambler 978 descrambles the decoded data in a complementary manner to the scrambling performed at access point 110. Although not shown in FIG. 9, a CRC checker may check each packet based on the CRC value included in the packet to determine whether the packet was received correctly or in error. The packet status may be used to initiate retransmission of packets received in error by user terminal 150y.

Channel estimator 960 estimates various channel characteristics (e.g., the path gains and noise variance) based on received pilot symbols. Channel estimator 960 provides a vector of path gain estimates, $\hat{h}_i(k)$, for each access point antenna to RX spatial processor 160y, which uses these path gain estimates to recover the transmitted data symbols, as shown in equation (6). Channel estimator 960 also provides the channel estimates to controller 180y. Controller 180y may perform various functions related to transmit diversity processing at user terminal 150y. Controller 180y may also select the proper rate and OFDM symbol size to use for data transmission based on the channel estimates and/or other considerations.

For user terminal 150x equipped with a single antenna 152x, demodulator 154x provides one stream of received symbols. RX spatial processor 160x performs spatial processing on the stream of received symbols with channel gain estimates (e.g., as shown in equation (4)) and provides a stream of recovered data symbols, $\{\hat{s}(k)\}$. RX data processor 170x then symbol demaps, deinterleaves, decodes, and descrambles the recovered data symbol stream in the manner as described above for user terminal 150y.

For clarity, the transmit diversity processing techniques have been described above for the downlink in an exemplary multi-antenna OFDM system. These techniques can also be used for the uplink by user terminals equipped with multiple antennas. Also for clarity, these techniques have been described for an OFDM system. The OFDM system can support one OFDM symbol size, two OFDM symbol sizes (as described above), or more than two OFDM symbol sizes. Many of these techniques may also be used for a single-carrier multi-antenna system.

FIG. 10 shows a flow diagram of a process 1000 for performing transmit diversity processing at a transmitter in a multi-antenna OFDM system. The transmitter encodes traffic data in accordance with a coding scheme to obtain coded data (block 1012). The coding scheme may comprise a fixed rate base code and a set of repetition and/or puncturing patterns for a set of code rates supported by the system. The transmitter then interleaves the coded data in accordance with an interleaving scheme to obtain interleaved data (block 1014). The transmitter next symbol maps the interleaved data in accordance with a modulation scheme to obtain a stream of data symbols (block 1016). The transmitter then processes each pair of data symbols to obtain two pairs of transmit symbols for transmission from a pair of transmit antennas (block 1018). Each transmit symbol is a version of a data symbol. The two pairs of transmit symbols may be transmitted from the pair of antennas either in two OFDM symbol periods or on two subbands. If $N_T$ transmit antennas are available for data transmission, then $N_T \cdot (N_T-1)/2$ different pairs of antennas may be used to transmit the data symbols. If the system supports multiple OFDM symbol sizes, then the transmitter transforms (e.g., performs OFDM modulation on) the stream of transmit symbols for each transmit antenna in accordance with a selected OFDM symbol size to obtain a corresponding stream of OFDM symbols for the transmit antenna (block 1020).

FIG. 11 shows a flow diagram of a process 1100 for performing data reception with transmit diversity at a receiver in the multi-antenna OFDM system. The receiver transforms a stream of samples for each of $N_R$ receive antennas in accordance with a selected OFDM symbol size to obtain a corresponding stream of received symbols for the receive antenna, where $N_R \geq 1$ (block 1112). The receiver obtains a stream of vectors of received symbols, where each vector includes $N_R$ received symbols for $N_R$ antennas and is for one subband in one OFDM symbol period (block 1114). The receiver processes each pair of vectors of received symbols with channel estimates to obtain two recovered data symbols, as shown in equation (4) or (6) (block 1116). The two vectors are for two OFDM symbol periods for the STTD scheme and for two subbands for the SFTD scheme. A stream of recovered data symbols is obtained for the stream of vectors of received symbols. The receiver then symbol demaps the stream of recovered data symbols in accordance with a demodulation scheme to obtain demodulated data (block 1118), deinterleaves the demodulated data in accordance with a deinterleaving scheme to obtain deinterleaved data (block 1120), and decodes the deinterleaved data in accordance with a decoding scheme to obtain decoded data (block 1122). The demodulation, deinterleaving, and decoding schemes are complementary to the modulation, interleaving, and coding schemes, respectively, used at the transmitter.

The transmit diversity processing techniques described herein may be implemented by various means. For example, these techniques may be implemented in hardware, software, or a combination thereof. For a hardware implementation, the processing units used to perform transmit diversity processing at each of the access point and the user terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmit diversity processing techniques may be implemented with modules (e.g., procedures, functions, and so on) that perform the functions described herein. The software codes may be stored in a memory unit (e.g., memory unit 132, 182x, or 182y in FIG. 1) and executed by a processor (e.g., controller 130, 180x, or 180y). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-program product for processing data for transmission in a wireless multi-antenna orthogonal frequency division multiplexing (OFDM) communication system comprising a memory unit having a set of instruction stored thereon, the set of instructions being executable by one or more processors and the set of instructions comprising:
   instructions for coding traffic data in accordance with a coding scheme to obtain coded data;
   instructions for interleaving the coded data in accordance with an interleaving scheme to obtain interleaved data;
   instructions for symbol mapping the interleaved data in accordance with a modulation scheme to obtain a stream of data symbols;
   instructions for forming at least one pair of data symbols from the stream of data symbols; and
   instructions for processing each pair of data symbols to obtain two pairs of transmit symbols for transmission from a pair of antennas, wherein each transmit symbol is a version of a data symbol, and further wherein the two pairs of transmit symbols are to be transmitted over at least one OFDM subband, and also further wherein the OFDM communication system is capable of adjusting the total number of available subbands.

2. The computer-program product of claim 1, wherein the two pairs of transmit symbols for each pair of data symbols are transmitted from a pair of antennas on the same subband in two OFDM symbol periods.

3. The computer-program product of claim 1, wherein the two pairs of transmit symbols for each pair of data symbols are transmitted from a pair of antennas on two subbands in one OFDM symbol period.

4. The computer-program product of claim 1, wherein $N_T$ antennas are available for data transmission and $N_T(N_T-1)/2$ different pairs of antennas are used to transmit pairs of data symbols in the stream, where $N_T \geq 2$.

5. The computer-program product of claim 1, wherein a plurality of subbands are used for data transmission, and wherein different pairs of antennas are used for adjacent subbands used for data transmission.

6. The computer-program product of claim 1, wherein the system supports a first OFDM symbol size with S subbands and a second OFDM symbol size with L subbands, where S is an integer greater than one and L is an integer multiple of S.

7. The computer-program product of claim 6, the instructions further comprising: instructions for forming a plurality of streams of transmit symbols for a plurality of antennas; and instructions for transforming each stream of transmit symbols in accordance with the first or second OFDM symbol size to obtain a corresponding stream of OFDM symbols.

8. The computer-program product of claim 1, wherein the instructions for coding comprise instructions for coding the traffic data in accordance with a base code to obtain code bits at a fixed code rate, and instructions for puncturing the code bits at the fixed code rate to obtain the coded data comprised of code bits at one of a plurality of code rates supported by the system.

9. The computer-program product of claim 8, wherein the base code is a rate 1/2 convolutional code.

10. The computer-program product of claim 8, wherein the plurality of code rates are associated with a plurality of puncturing patterns.

11. The computer-program product of claim 1, wherein the instructions for coding comprise instructions for coding the traffic data in accordance with a base code to obtain code bits at a fixed code rate, and instructions for repeating the code bits at the fixed code rate to obtain the coded data comprised of code bits at a lower code rate than the fixed code rate.

12. The computer-program product of claim 1, wherein the instructions for interleaving comprise instructions for forming sequences of code bits from the coded data, and for each of the sequences, instructions for mapping each code bit in the sequence to one of a plurality of subbands based on the interleaving scheme.

13. The computer-program product of claim 12, wherein each sequence of code bits is designated for transmission on the plurality of subbands in one OFDM symbol period.

14. The computer-program product of claim 1, wherein the instructions for interleaving comprise instructions for forming sequences of code bits from the coded data, partitioning each of the sequences into M blocks of code bits for transmission on M disjoint groups of subbands, one block of code bits for each group of subbands, where $M \geq 2$, and for each of the M blocks for each sequence, and mapping each code bit in the block to one of the subbands in the group for the block based on the interleaving scheme.

15. The computer-program product of claim 1, wherein the instructions for symbol mapping comprise instructions for grouping sets of B bits in the interleaved data to form B-bit binary values, where $B \geq 1$, and map each of the B-bit binary values to a data symbol based on the modulation scheme, wherein the modulation scheme is defined with Gray mapping such that two adjacent data symbols in a signal constellation for the modulation scheme differ by at most one bit among B bits.

16. The computer-program product of claim 15, wherein the instructions for symbol mapping further comprise instructions for reordering the B bits for each of the sets, and wherein the sets of reordered B bits are used to form the B-bit binary values.

17. A computer-program product for processing data for transmission in a wireless multi-antenna orthogonal frequency division multiplexing (OFDM) communication system comprising a memory unit having a set of instruction stored thereon, the set of instructions being executable by one or more processors and the set of instructions comprising:
   instructions for coding traffic data in accordance with a coding scheme to obtain coded data;
   instructions for interleaving the coded data in accordance with an interleaving scheme to obtain interleaved data;
   instructions for symbol mapping the interleaved data in accordance with a modulation scheme to obtain a stream of data symbols;
   instructions for forming at least one pair of data symbols from the stream of data symbols; and
   instructions for demultiplexing the stream of data symbols such that each pair of data symbols is transmitted from a pair of antennas and consecutive pairs of data symbols are transmitted from different pairs of antennas, and further wherein the two pairs of transmit symbols are to be transmitted over at least one OFDM subband, and also further wherein the OFDM communication system is capable of adjusting the total number of available subbands.

18. The computer-program product of claim 17, wherein the instructions for demultiplexing comprise instructions for transmitting each code bit of the coded data from a maximum number of antennas achievable for the code bit based on a code rate of the code bit.

19. The computer-program product of claim 17, wherein the MIMO system implements orthogonal frequency division multiplexing (OFDM).

20. The computer-program product of claim 19, wherein each pair of data symbols in the stream is transmitted from a pair of antennas on one subband, and wherein pairs of data symbols for adjacent subbands are transmitted on different pairs of antennas.

21. The computer-program product of claim 19, wherein each group of S code bits for the coded data is interleaved, where S is the number of subbands used for data transmission.

22. A computer-program product for processing data for transmission in a wireless multi-anenna orthogonal frequency division multiplexing (OFDM) communication system comprising a memory unit having a set of instruction stored thereon, the set of instructions being executable by one or more processors and the set of instructions comprising:
   instructions for coding traffic data in accordance with a coding scheme to obtain coded data;
   instructions for interleaving the coded data in accordance with an interleaving scheme to obtain interleaved data;
   instructions for symbol mapping the interleaved data in accordance with a modulation scheme to obtain a stream of data symbols;
   instructions for forming at least one pair of data symbols from the stream of data symbols; and
   instructions for demultiplexing the stream of data symbols such that each pair of data symbols is transmitted from a pair of antennas on two subbands, and further wherein the OFDM communication system is capable of adjusting the total number of available subbands.

23. The computer-program product of claim 22, wherein each pair of data symbols in the stream is transmitted on two adjacent subbands usable for data transmission.

24. The computer-program product of claim 22, further comprising:
   instructions for processing each pair of data symbols in the stream to obtain first and second pairs of transmit symbols, each transmit symbol being a version of one of the data symbols in the pair of data symbols, wherein the first pair of transmit symbols is transmitted from the pair of antennas on a first subband and the second pair of transmit symbols is transmitted from the pair of antennas on a second subband.

25. The computer-program product of claim 22, wherein the first and second pairs of transmit symbols are transmitted concurrently in one OFDM symbol period on the first and second subbands, respectively.

26. A computer-program product for processing data for transmission in a wireless multi-antenna orthogonal frequency division multiplexing (OFDM) communication system comprising a memory unit having a set of instruction stored thereon, the set of instructions being executable by one or more processors and the set of instructions comprising:
   instructions for obtaining a stream of vectors of received symbols, each vector including N received symbols for N receive antennas, where N is one or greater;
   instructions for forming at least one pair of vectors from the stream of vectors of received symbols;
   instructions for processing each pair of vectors to obtain two recovered data symbols, which are estimates of two data symbols transmitted as two pairs of transmit symbols from two transmit antennas, each transmit symbol being a version of a data symbol, wherein a stream of recovered data symbols is obtained for the stream of vectors of received symbols, and further wherein the two pairs of transmit symbols are transmitted over at least one OFDM subband, and also further wherein the OFDM communication system is capable of adjusting the total number of available subbands;
   instructions for symbol demapping the stream of recovered data symbols in accordance with a demodulation scheme to obtain demodulated data;
   instructions for deinterleaving the demodulated data in accordance with a deinterleaving scheme to obtain deinterleaved data; and
   instructions for decoding the deinterleaved data in accordance with a decoding scheme to obtain decoded data.

27. The computer-program product of claim 26, wherein each pair of vectors of received symbols is for two OFDM symbol periods.

28. The computer-program product of claim 26, wherein each pair of vectors of received symbols is for two subbands.

29. The computer-program product of claim 26, wherein the system supports a first OFDM symbol size with S subbands and a second OFDM symbol size with L subbands, where S is an integer greater than one and L is an integer multiple of S.

30. The computer-program product of claim 29, further comprising: instructions for transforming a stream of samples for each of the N receive antennas in accordance with the first or second OFDM symbol size to obtain a corresponding stream of received symbols for the receive antenna, and wherein the stream of vectors of received symbols is obtained from N streams of received symbols for the N receive antennas.

31. The computer-program product of claim 26, wherein N=1 and each vector includes one received symbol for one receive antenna.

32. The computer-program product of claim 26, wherein N>1 and each vector includes multiple received symbols for multiple receive antennas.

* * * * *